US008947671B2

(12) United States Patent
Strandjord et al.

(10) Patent No.: US 8,947,671 B2
(45) Date of Patent: Feb. 3, 2015

(54) METHOD AND SYSTEM FOR DETECTING OPTICAL RING RESONATOR RESONANCE FREQUENCIES AND FREE SPECTRAL RANGE TO REDUCE THE NUMBER OF LASERS IN A RESONATOR FIBER OPTIC GYROSCOPE

(71) Applicant: Honeywell International Inc., Morristown, MN (US)

(72) Inventors: Lee K. Strandjord, Tonka Bay, MN (US); Mary K. Salit, Plymouth, MN (US); Tiequn Qiu, Glendale, AZ (US); Glen A. Sanders, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 115 days.

(21) Appl. No.: 13/774,678

(22) Filed: Feb. 22, 2013

(65) Prior Publication Data
US 2014/0240712 A1 Aug. 28, 2014

(51) Int. Cl.
G01C 19/72 (2006.01)
(52) U.S. Cl.
CPC ............ *G01C 19/721* (2013.01); *G01C 19/727* (2013.01)
USPC .......................................... 356/461; 356/460
(58) Field of Classification Search
CPC ....... G01C 19/727; G01C 19/66; H01S 3/083
USPC ................................................ 356/459–476
See application file for complete search history.

(56) References Cited

U.S. PATENT DOCUMENTS

| 3,861,220 A | 1/1975 | Felsenthal, Jr. |
| 4,135,822 A | 1/1979 | Ezekiel |

(Continued)

FOREIGN PATENT DOCUMENTS

| EP | 0240949 | 10/1987 |
| EP | 1391693 | 2/2004 |

OTHER PUBLICATIONS

Chow et al., "Backscatter-immune, Polarization Managed, All Fiber Sagnac Sensing Interferometer", "Optics Express", Mar. 19, 2007, pp. 3110-3119, vol. 15, No. 6.

(Continued)

*Primary Examiner* — Tri T Ton
(74) *Attorney, Agent, or Firm* — Fogg & Powers LLC

(57) ABSTRACT

A resonator fiber optic gyroscope (RFOG) is provided. The RFOG includes a gyroscope resonator having a clockwise input port and a counter-clockwise input port; a first laser configured to couple a clockwise optical beam into to the clockwise input port; a clockwise Pound-Drever-Hall modulation generator to modulate the clockwise optical beam with a resonance tracking modulation before the clockwise optical beam is coupled into the clockwise input port; bias correction electronics; FSR-detection-and-servo electronics including a switch communicatively coupled to the clockwise Pound-Drever-Hall modulation generator; a clockwise transmission detector configured to receive an optical beam output from the counter-clockwise input port and output signals to the bias correction electronics and the FSR-detection-and-servo electronics; and a second laser configured to couple a counter-clockwise optical beam into to the counter-clockwise input port, wherein the FSR of the gyroscope resonator is measured based on the Pound-Drever-Hall modulation of the clockwise optical beam.

20 Claims, 13 Drawing Sheets

(56) References Cited

U.S. PATENT DOCUMENTS

| | | |
|---|---|---|
| 4,274,742 A | 6/1981 | Lustig |
| 4,323,310 A | 4/1982 | Shaw et al. |
| 4,352,562 A | 10/1982 | Minden |
| 4,673,293 A | 6/1987 | Sanders |
| 4,702,600 A | 10/1987 | Handrich et al. |
| 4,807,999 A | 2/1989 | Soo Hoo |
| 4,815,851 A | 3/1989 | Soohoo |
| 4,863,272 A | 9/1989 | Coccoli |
| 4,921,354 A | 5/1990 | SooHoo |
| 5,018,857 A | 5/1991 | Sanders et al. |
| 5,090,809 A | 2/1992 | Ferrar |
| 5,090,810 A | 2/1992 | Malvern |
| 5,100,236 A | 3/1992 | Hoo et al. |
| 5,112,128 A | 5/1992 | Soo Hoo et al. |
| 5,131,749 A | 7/1992 | Varnham |
| 5,141,315 A | 8/1992 | Malvern |
| RE34,121 E | 11/1992 | Benoist |
| 5,229,831 A | 7/1993 | Carroll et al. |
| 5,237,387 A | 8/1993 | Sanders |
| 5,289,258 A | 2/1994 | Szafraniec et al. |
| 5,296,912 A | 3/1994 | Strandjord et al. |
| 5,325,174 A | 6/1994 | Danko |
| 5,349,441 A | 9/1994 | Sanders |
| 5,384,637 A | 1/1995 | Sanders et al. |
| 5,398,111 A | 3/1995 | Cardarelli |
| 5,420,684 A | 5/1995 | Carroll |
| 5,459,575 A | 10/1995 | Malvern |
| 5,465,149 A | 11/1995 | Strandjord et al. |
| 5,469,257 A | 11/1995 | Blake et al. |
| 5,493,623 A | 2/1996 | Frische et al. |
| 5,526,451 A | 6/1996 | Cahill et al. |
| 5,610,714 A | 3/1997 | Malvern et al. |
| 5,734,469 A | 3/1998 | Strandjord |
| 5,767,968 A | 6/1998 | Strandjord |
| 5,781,300 A | 7/1998 | Strandjord et al. |
| 5,923,424 A | 7/1999 | Sanders et al. |
| 5,926,275 A | 7/1999 | Sanders et al. |
| 6,014,217 A | 1/2000 | Sanders et al. |
| 6,175,410 B1 | 1/2001 | Szafraniec et al. |
| 6,204,921 B1 | 3/2001 | Strandjord et al. |
| 6,539,155 B1 | 3/2003 | Broeng et al. |
| 6,690,687 B2 | 2/2004 | Ksendzov et al. |
| 6,765,678 B2 | 7/2004 | Strandjord et al. |
| 6,778,279 B2 | 8/2004 | Lange et al. |
| 6,865,317 B2 | 3/2005 | Vahala et al. |
| 6,885,794 B2 | 4/2005 | Scheuer et al. |
| 7,034,946 B2 | 4/2006 | Chen et al. |
| 7,038,783 B2 | 5/2006 | Standjord et al. |
| 7,065,276 B2 | 6/2006 | Scheuer et al. |
| 7,123,800 B2 | 10/2006 | Kaplan |
| 7,149,381 B2 | 12/2006 | Margalit et al. |
| 7,231,103 B2 | 6/2007 | Yamashita |
| 7,245,381 B2 | 7/2007 | Marino et al. |
| 7,327,460 B2 | 2/2008 | Sanders et al. |
| 7,362,443 B2 | 4/2008 | Sanders et al. |
| 7,372,574 B2 | 5/2008 | Sanders et al. |
| 7,388,671 B2 | 6/2008 | Sanders et al. |
| 7,463,360 B2 | 12/2008 | Hughes et al. |
| 7,515,272 B2 | 4/2009 | Strandjord et al. |
| 7,522,284 B2 | 4/2009 | Sanders et al. |
| 7,583,384 B2 | 9/2009 | Keith et al. |
| 7,586,619 B2 | 9/2009 | Strandjord et al. |
| 7,751,055 B2 | 7/2010 | Sanders et al. |
| 7,802,928 B2 | 9/2010 | Strabley et al. |
| 7,848,601 B2 | 12/2010 | Carothers |
| 7,855,789 B2 | 12/2010 | Strandjord et al. |
| 7,864,328 B2 | 1/2011 | Strandjord |
| 7,869,052 B2 | 1/2011 | Strandjord |
| 7,933,020 B1 | 4/2011 | Strandjord et al. |
| 8,009,296 B2 | 8/2011 | Sanders et al. |
| 8,085,407 B2 | 12/2011 | Qiu et al. |
| 8,184,299 B2 | 5/2012 | Kitamura et al. |
| 8,213,019 B2 | 7/2012 | Strandjord et al. |
| 2002/0044737 A1 | 4/2002 | Hung |
| 2003/0169428 A1 | 9/2003 | Lange |
| 2004/0061863 A1 | 4/2004 | Digonnet |
| 2004/0263856 A1 | 12/2004 | Willig et al. |
| 2007/0097374 A1 | 5/2007 | Ren-Young |
| 2007/0133003 A1 | 6/2007 | Sanders et al. |
| 2007/0242276 A1 | 10/2007 | Hughes et al. |
| 2008/0079946 A1 | 4/2008 | Greening |
| 2008/0137091 A1 | 6/2008 | Sanders et al. |
| 2010/0002239 A1 | 1/2010 | Strandjord et al. |
| 2010/0046000 A1 | 2/2010 | Kitamura et al. |
| 2010/0053631 A1 | 3/2010 | Kitamura |
| 2010/0225922 A1 | 9/2010 | Strandjord |
| 2010/0225923 A1 | 9/2010 | Strandjord et al. |
| 2010/0245834 A1 | 9/2010 | Strandjord |
| 2010/0253948 A1 | 10/2010 | Strandjord et al. |
| 2011/0181886 A1 | 7/2011 | Strandjord et al. |
| 2011/0181887 A1 | 7/2011 | Tarleton et al. |
| 2011/0255094 A1 | 10/2011 | Mohageg et al. |
| 2011/0292396 A1 | 12/2011 | Strandjord et al. |
| 2012/0050745 A1 | 3/2012 | Qiu et al. |
| 2013/0107271 A1* | 5/2013 | Strandjord et al. ........... 356/461 |
| 2013/0271770 A1* | 10/2013 | Sanders et al. ................ 356/461 |

OTHER PUBLICATIONS

Vawter et el., "Developments in Pursuit of a Micro-Optic Gyroscope", "Sand Report SAND2003-0665", Mar. 2003, pp. 1-39.

* cited by examiner

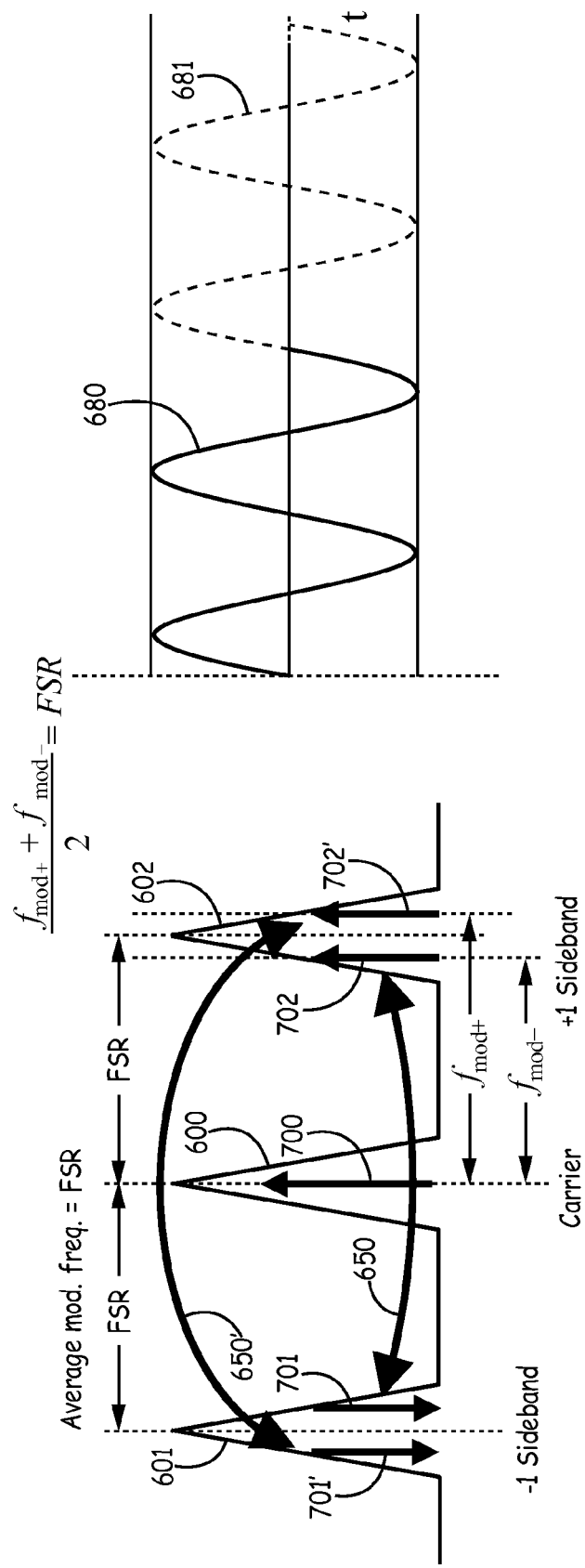

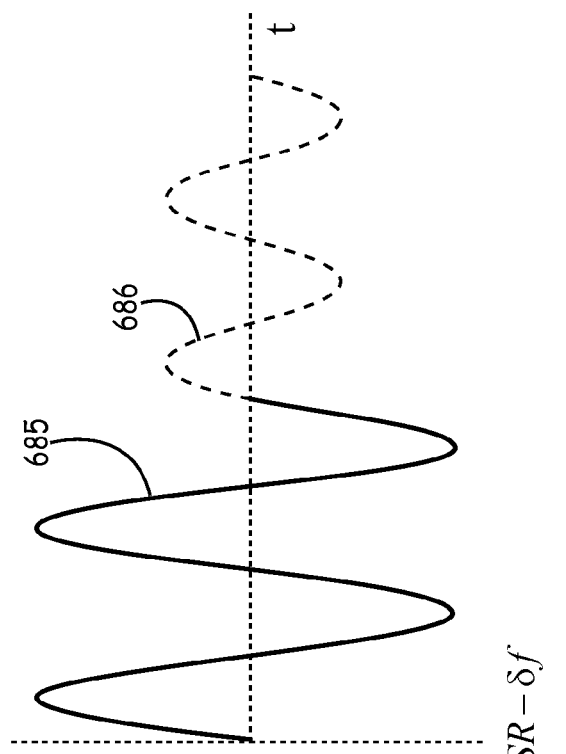
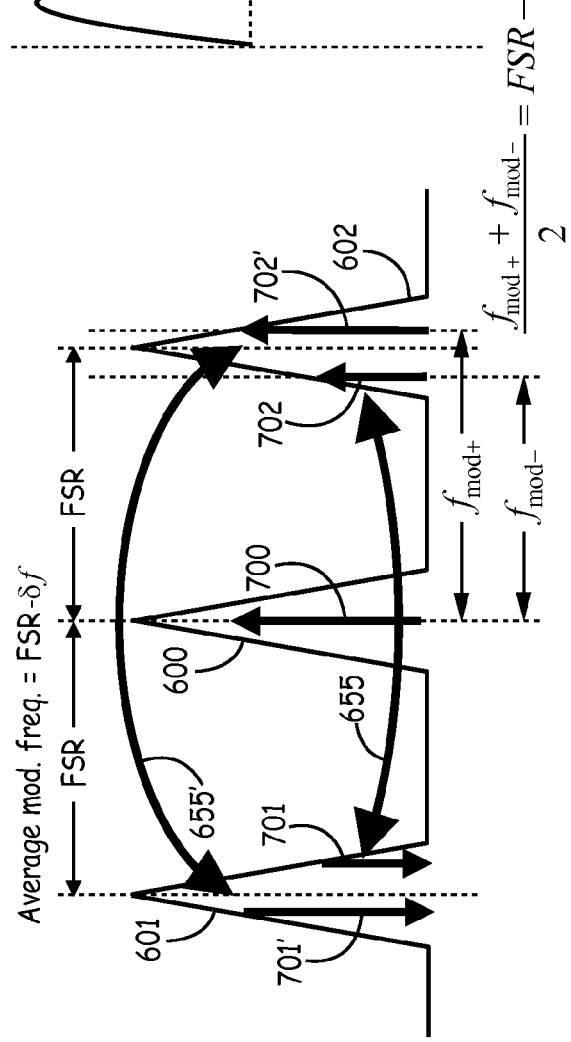
FIG. 6D
FIG. 6C

METHOD AND SYSTEM FOR DETECTING OPTICAL RING RESONATOR RESONANCE FREQUENCIES AND FREE SPECTRAL RANGE TO REDUCE THE NUMBER OF LASERS IN A RESONATOR FIBER OPTIC GYROSCOPE

BACKGROUND

The Resonator Fiber Optic Gyroscope (RFOG) has potential of meeting the needs in many areas of the inertial sensing market. To overcome optical backscatter errors, currently available RFOGs lock the clockwise (CW) and counter-clockwise (CCW) laser frequencies onto different longitudinal modes of the gyro sensing resonator. These technologies separate the counter-propagating laser frequencies and up-convert the backscatter errors well above the rotation measurement frequency band. However, if only two lasers are used, the gyro sensing resonator free spectral range (FSR) becomes a part the rotation measurement. Thus, the gyro sensing resonator free spectral range must be measured with great precision to reduce the adverse effects on the sensing of the rotation.

To accurately measure the FSR, currently available RFOGs use a third laser frequency to probe the sensing resonator. It is difficult to modulate three lasers to detect resonance in a way that modulation imperfections do not cause large errors, since one laser is a master laser and the other two lasers are slave lasers. Slave lasers are modulated with high precision, but it is difficult to modulate the master laser with high precision.

Other currently available RFOGs use a master laser and three slave lasers. In this latter technology, the master laser is not used for rotation sensing and the three slave lasers are modulated with high precision. However, the number of lasers and associated phase lock loop electronics results in a significant increase in the cost, size, weight, and electrical power consumption of the RFOG.

SUMMARY

The present application relates to a resonator fiber optic gyroscope. The resonator fiber optic gyroscope includes a gyroscope resonator having a clockwise input port and a counter-clockwise input port; a first laser configured to couple a clockwise optical beam into to the clockwise input port; a clockwise Pound-Drever-Hall modulation generator to modulate the clockwise optical beam with a resonance tracking modulation before the clockwise optical beam is coupled into the clockwise input port; bias correction electronics; FSR-detection-and-servo electronics including a switch communicatively coupled to the clockwise Pound-Drever-Hall modulation generator; a clockwise transmission detector configured to receive an optical beam output from the counter-clockwise input port and output signals to the bias correction electronics and the FSR-detection-and-servo electronics; and a second laser configured to couple a counter-clockwise optical beam into to the counter-clockwise input port, wherein the FSR of the gyroscope resonator is measured based on the Pound-Drever-Hall modulation of the clockwise optical beam.

DRAWINGS

FIGS. 6A and 6C show exemplary vector arrows representing the frequency, amplitude, and phase of optical signals relative to resonance peaks in accordance with the present invention;

FIGS. 6B and 6D show modulator output signals associated with respective optical signals of FIGS. 6A and 6C for measuring free spectral range in accordance with the present invention;

DETAILED DESCRIPTION

Figure 1:
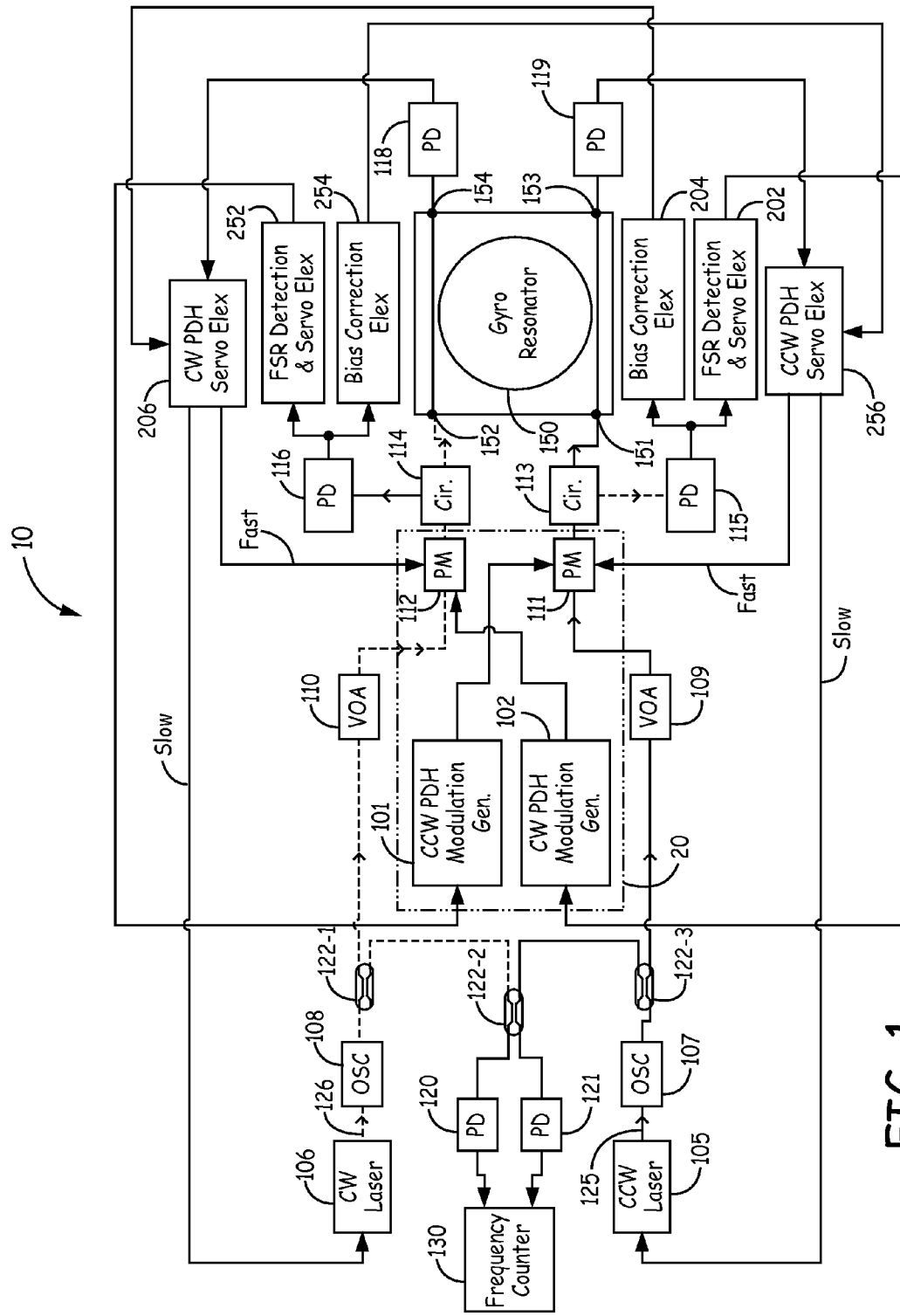
FIG. 1 is a block diagram of one embodiment of a Resonator Fiber Optic Gyroscope (RFOG) with two lasers in accordance with the present invention.

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

The resonator fiber optic gyroscope (RFOG) system described herein uses only two lasers and their associated phase lock loop electronics to: 1) reduce optical backscatter errors as in the three laser frequency RFOG described above; 2) accurately measure the free spectral range (FSR) of the gyroscope resonator as in the four laser RFOG described above; and 3) provide an accurate resonance tracking modulation as in the four laser RFOG described above. The RFOG system described herein employs a laser frequency modulation or phase modulation scheme that reduces the number of required lasers to two and eliminates all phase lock loops for the lasers. The two lasers are locked onto separate, counter-propagating longitudinal modes of the sensing resonator and the resonance tracking modulation of each laser is performed by a Pound-Drever-Hall (PDH) modulation generator at a very high frequency to generate laser frequency sidebands. The laser frequency sidebands provide a way to obtain information of the resonance frequencies of the sensing resonator, and information about the sensing resonator free spectral range (FSR). In order to obtain an accurate measurement of the FSR, the frequency of the resonance tracking modulation is frequency modulated (FM). The terms "sensing resonator", "gyroscope sensing resonator" and "gyroscope resonator" are used interchangeably herein.

The nominal frequency of the laser frequency modulation or phase modulation is set to some multiple of the sensing resonator FSR, or some multiple of the sensing resonator FSR plus a delta. The delta (also referred to herein as small delta or Δf) is less than the linewidth of gyro resonator in the RFOG. In one implementation of this embodiment, the delta is less than half of the linewidth of the gyro resonator. To measure the FSR, the laser frequency modulation or phase modulation is modulated at a lower frequency than the resonance tracking modulation of each laser. The resonance frequencies and FSR of the gyroscope resonator are measured using synchronous detection techniques. In one implementation of this embodiment, only one of the two lasers is resonance tracking modulated.

There are several advantages to only detecting at very high frequencies, (e.g., ten times the FSR). A typical detection frequency can be 100 MHz or higher. When the detection frequency is at these high frequencies, the laser intrinsic relative intensity noise (RIN) is typically very low, the RIN from passive optical filtering is very low, and the laser phase noise after passive optical filtering is very low. Therefore, the RIN is controlled entirely with passive filtering. Since the RIN is controlled entirely with passive filtering, the high speed intensity modulators used in prior art RFOGs are eliminated, the optical loss in the RFOG is reduced, and the laser power required for the RFOG is reduced. In addition, high frequency phase noise is controlled entirely with passive filtering by the gyroscope resonator. In one implementation of this embodiment, at least some passive filtering of both RIN and laser phase noise is done with an unbalanced Mach Zehnder interferometer instead of a cavity. This latter embodiment provides lower optical loss, reduced laser power, and simplified filter control electronics.

FIG. 1 is a block diagram of one embodiment of a Resonator Fiber Optic Gyroscope (RFOG) 10 with two lasers 105 and 106 in accordance with the present invention. The RFOG 10 does not require phase lock loops. High bandwidth Pound-Drever-Hall (PDH) laser stabilization loops control the relative laser frequency noise between the lasers by stabilizing the lasers to the same optical cavity, the gyro sensing resonator. Frequency modulation of PDH modulation is used to measure the FSR and to provide ultra-low distortion digital modulation.

The RFOG 10 includes a counter-clockwise (CCW) laser 105, a clockwise (CW) laser 106, a CCW phase modulator (PM) 111, a CW phase modulator (PM) 112, a CCW Pound-Drever-Hall (PDH) modulation generator 101, a CW Pound-Drever-Hall (PDH) modulation generator 102, circulators 113 and 114, a gyroscope resonator 150 with ports 151-154, photodetectors 115, 116, 118, 119, 120, and 121, bias correction electronics 204 and 254, FSR-detection-and-servo electronics 202 and 252, clockwise Pound-Drever-Hall servo electronics 206, and counter-clockwise Pound-Drever-Hall servo electronics 256. A modulation system 20 includes the phase modulators 111 and 112, the CCW PDH modulation generator 101, and the CCW PDH modulation generator 102. The phase modulator 112 is referred to herein as a "CW phase modulator 112". The gyroscope resonator 150 is also referred to herein as "sensing resonator 150", "gyro resonator 150", or "sensor coil 150". The gyroscope resonator 150 is a solid core optical fiber or a hollow optical fiber. In one implementation of this embodiment, only the CW path or the CCW path is operated on as described below so that the FSR is measured by implementing half of the system described herein as is understandable to one skilled in the art upon reading and understanding this document.

An optical beam represented generally at 126 is emitted from the clockwise (CW) laser 106, passed through an optical signal conditioner 108, a variable optical attenuator 110, and the CW phase modulator 112. The CW laser 106 is also referred to herein as "first laser 106". The CW phase modulator 112 is also referred to herein as "phase modulator 112". The optical beam 126 is also referred to herein as "clockwise optical beam 126". The phase modulator 112 is driven by the CW Pound-Drever-Hall (PDH) modulation generator 102 and modulates the clockwise optical beam 126 before the clockwise optical beam 126 is coupled into a clockwise input port 152 of the gyroscope resonator 150. The optical beam output from the phase modulator 112 is passed through an optical circulator 114 to the gyroscope resonator 150 via clockwise input port 152. The "clockwise input port 152" is also referred to herein as "port 152". The CW laser 106 is locked onto the resonance of the gyro resonator 150 with a high bandwidth feedback loop using the PDH method. Pound-Drever-Hall (PDH) modulation techniques are known to those skilled in the art. In one implementation of this embodiment, the clockwise optical beam 126 has a frequency set to the first clockwise longitudinal mode of the sensing resonator 150.

An optical beam represented generally at 125 emitted from the counter-clockwise (CCW) laser 105 is passed through an optical signal conditioner 107, a variable optical attenuator 109, and the CCW phase modulator 111. The CCW laser 105 is also referred to herein as "second laser 106". The CCW phase modulator 111 is also referred to herein as "phase modulator 111". The optical beam 125 is also referred to herein as "counter-clockwise optical beam 125". The phase modulator 111 is driven by the CCW Pound-Drever-Hall (PDH) modulation generator 101 and modulates the counter-clockwise optical beam 125 before the counter-clockwise optical beam 125 is coupled into a counter-clockwise input port 151 of the gyroscope resonator 150. The optical beam output from the phase modulator 111 is passed through an optical circulator 113 to the gyroscope resonator 150 via the counter-clockwise input port 151. The "counter-clockwise input port 151" is also referred to herein as "port 151". The CCW laser 105 is locked onto the resonance of the gyro resonator 150 with a high bandwidth feedback loop using the PDH method so the relative frequency noise between the CW laser 106 and the CCW laser 105 is highly correlated for those frequencies when there is sufficient or high loop gain in the RFOG 10 as known to one skilled in the art. In one implementation of this embodiment, the counter-clockwise optical beam 125 has a frequency set to the second counter-clockwise longitudinal mode of the sensing resonator 150. The first CW longitudinal mode and the second CCW longitudinal mode differ by at least one FSR.

The method and system described herein permits an accurate measurement of the FSR or the gyro resonator 150. The modulation frequency $f_{mod}$ is periodically switched between $f_{mod+}$ and $f_{mod-}$ to cancel out errors due to imperfection in the modulation. The term "$f_{FSR}$" and $v_{FSR}$" are used interchangeably herein. The $f_{mod+}$ is also referred to herein as a first modulation frequency and $f_{mod-}$ also referred to herein as a second modulation frequency.

The optical beam output from the CW laser 106 propagates clockwise through the gyro resonator 150 and passes, via the CW transmission port 151, through the circulator 113 to the CW transmission detector 115. The optical beam from CW laser 106 must transmit through gyro resonator 150 to reach transmission detector 115. If the optical frequency of the CW laser 106 is swept, resonance peaks are observed at the transmission detector 115. A large portion of the optical beam 126 from the CW laser 106 that enters port 152 does not enter gyro resonator 150 and therefore does not transmit through gyro resonator 150, but rather goes directly to CW reflection port 154, to be incident on the CW reflection detector 118. The portion of the optical beam that entered the gyro resonator 150 exits the gyro resonator 150 to reflection port 154 and interferes with the optical beam that did not enter the gyro resonator 150. If the optical frequency of the CW laser 106 is swept, resonance dips are observed at the reflection detector 118. Output from the CW reflection detector 118 is input to the CW PDH servo electronics 206. The CW reflection detector 118 and CW PDH servo electronics 206 detect light from the CW reflection port 154 of the gyro resonator 150. In one implementation of this embodiment, over 90% of the optical beam 126 from the CW laser 106 that enters port 152 goes directly to CW reflection port 154, to be incident on the CW reflection detector 118. In another implementation of this embodiment, over 80% of the optical beam 126 from the CW laser 106 that enters port 152 goes directly to CW reflection port 154, to be incident on the CW reflection detector 118.

The optical beam 125 output from the CCW laser 105 propagates counter-clockwise through the gyro resonator 150 and passes, via the CCW transmission port 152, through the circulator 114 to the CCW transmission detector 116. The optical beam from CCW laser 105 must transmit through gyro resonator 150 to reach transmission detector 116. If the optical frequency of the CW laser 105 is swept, resonance peaks are observed at the transmission detector 116. A portion of the optical beam from the CCW laser 105 that enters port 151 does not enter gyro resonator 150 and therefore does not transmit through gyro resonator 150, but rather goes directly to CCW reflection port 153 to be incident on the CCW reflection detector 119. A portion of the optical beam that entered the gyro resonator 150 exits the resonator to reflection port 153 and interferes with the optical beam that did not enter the resonator. If the optical frequency of the CW laser 105 is swept, resonance dips are observed at the reflection detector 119. Output from the CCW reflection detector 119 is input to the CCW PDH servo electronics 256. The CCW reflection detector 119 and the CCW PDH servo electronics 256 detect light from the CCW reflection port 154 of the gyro resonator 150. In one implementation of this embodiment, over 90% of the optical beam 125 from the CCW laser 105 that enters port 151 goes directly to CCW reflection port 153, to be incident on the CCW reflection detector 119. In another implementation of this embodiment, over 80% of the optical beam 125 from the CCW laser 105 that enters port 151 goes directly to CCW reflection port 153, to be incident on the CCW reflection detector 119.

The line shape of the resonance peak of the CW optical beam output at the transmission port 151 typically has significantly better symmetry than the lineshape of the resonance dip of the CW optical beam output from the reflection port 154. Likewise, the line shape of the resonance peak of the CCW optical beam output at the transmission port 152 has significantly better symmetry than the lineshape of the resonance dip of the CCW optical beam output from the reflection port 153. Operation on the resonance peak of the gyro resonator 150 at the CW transmission detector 115 and CCW transmission detector 116 provides better bias performance but limits the choices in modulation frequency.

The CW transmission detector 115 outputs voltage signals to the bias correction electronics 204 and the FSR-detection-and-servo electronics 202. The bias correction electronics 204 and the FSR-detection-and-servo electronics 202 are also referred to herein as "first bias correction electronics 204" and "first FSR-detection-and-servo electronics 202", respectively. The CCW transmission detector 116 outputs voltage signals to the bias correction electronics 254 and the FSR-detection-and-servo electronics 252. The bias correction electronics 254 and the FSR-detection-and-servo electronics 252 are also referred to herein as "second bias correction electronics 254" and "second FSR-detection-and-servo electronics 252".

Output from the bias correction electronics 204 is sent to the CW PDH servo electronics 206. Output from the bias correction electronics 254 is sent to the CCW PDH servo electronics 256.

Output from the first FSR-detection-and-servo electronics 202 is sent to the CW PDH modulation generator 102. Output from the second FSR-detection-and-servo electronics 252 is sent to the CCW PDH modulation generator 101.

Slow output from the CCW PDH servo electronics 256 is sent to the CCW laser 105 and fast output from the CCW PDH servo electronics 256 is sent to the phase modulator 111 in the path of the CCW optical beam 125. Likewise, slow output from the CW PDH servo electronics 206 is sent to the CW laser 106 and fast output from the CW PDH servo electronics 206 is sent to the phase modulator 112 in the path of the CW optical beam 126.

In this embodiment it is assumed that the type of laser employed does not have optical frequency tuning that is fast enough to support a laser lock onto the resonator with the required loop bandwidth. Therefore, the feedback control is split into two channels: a slow channel that goes to the laser 105 or 106 for controlling laser frequency at frequencies within the laser tuning bandwidth, including DC; and a fast channel that goes to a lithium niobate phase modulator 112, which has a very high frequency bandwidth, but no gain at DC. The gain of the slow channel is high at very low frequencies, whereas the gain of the fast loop is high at much higher frequencies. In one implementation of this embodiment, the lasers 105 and 106 have a very high frequency tuning bandwidths that can support the entire PDH loop bandwidth. For this embodiment, only one feedback channel to the laser is required. For instance, in one embodiment, the appreciable-magnitude signals for the laser feedback may be in the input frequency range of DC to 20 kHz, and those for the phase modulator input frequency range may be in the 1 kHz to 10 MHz range. In this case, there is some overlap in the frequency content of the feedback signals to the laser and the phase modulator, so that there are no regions of low gain in feedback loop from DC to 10 MHz.

As shown in FIG. 1, photo-detectors 120 and 121 are coupled to receive optical power from the CW laser 106 and the CCW laser 105 via optical taps 122-1 and 122-3, respectively. The output from the photo-detectors 120 and 121 is input to the frequency counter 130. To measure rotation rate, the optical frequency difference between lasers 105 and 106 must be known to a high degree of resolution and accuracy. Coupler 122-2 combines portions of the laser beams 125 and 126 from lasers 105 and 106, respectively, which interfere at detectors 120 and 121. The interference produces a beat note at the frequency difference between the two lasers 105 and 106. Detectors 120 and 121 convert the optical beat note to an electrical signal that goes to frequency counter 120 that measures the frequency of the beat note, thus the frequency difference between the two lasers. The electrical signal from either detector 120 or 121 can be used to measure the laser difference frequency. However, both detectors 120 are 121 are required to determine which laser 105 or 106 has the higher frequency. This determination is made by observing the phase relationship between the beat signals from detectors 120 and 121.

Figure 2:
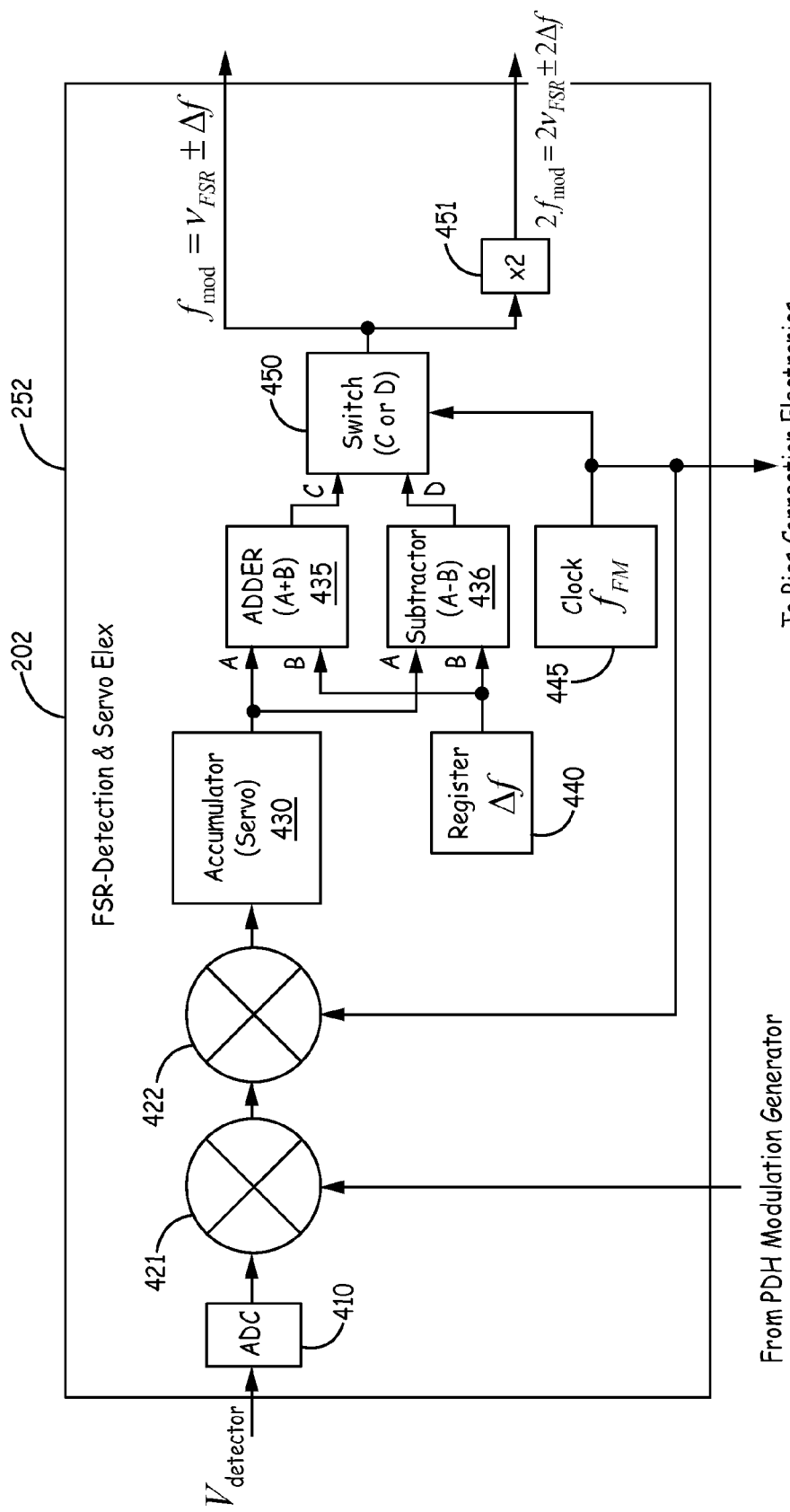
FIG. 2 is a block diagram of one embodiment of free spectral range-detection-and-servo electronics in the RFOG of FIG. 1 in accordance with the present invention.

FIG. 2 is a block diagram of one embodiment of free spectral range-detection-and-servo electronics 202 and 252 in the RFOG of FIG. 1 in accordance with the present invention. The FSR-detection-and-servo electronics 202 and 252 each include an analog-to-digital convert (ADC) 410, a first digital mixer 421, a second digital mixer 422, an accumulator (servo) 430, a register 440, an adder 435, a subtractor 436, a clock 445, a switch 450, and a 2× multiplier 451. The first digital mixer 421 is also referred to herein as "first mixer 421" or "first demodulator 421". The second digital mixer 422 is also referred to herein as "second mixer 422" or "second demodulator 422".

In the FSR-detection-and-servo electronics 202, the ADC 410 inputs voltage signals from the CW transmission detector 115. The output from the ADC 410 is sent to the first digital mixer 421 to be mixed with a signal occurring at twice the modulation frequency output by the CW PDH modulation generator 102 (either $2f_{mod+}$ or $2f_{mod-}$ depending on the switching state of the switch 450). The output of the first digital mixer 421 is input to the second digital mixer 422 to be mixed with a clock signal, occurring at a switching frequency $f_{FM}$, input from the clock 445. The clock 445 controls the switching frequency $f_{FM}$ at which the switch 450 switches from modulating between $f_{mod+}$ and $f_{mod-}$ as described in more detail below. The periodic switching cancels errors due to imperfections in the modulation. The FSR of the gyroscope resonator is sensed based on the periodic switching as described in detail below. The clock signal from the clock 445 is also output to the bias correction electronics 204.

The output from the second mixer 422 is sent to the accumulator 430. The accumulator 430 outputs a signal (A) to the adder 435 and to the subtractor 436. When the average modulation frequency is equal to the free spectral range, the average output of digital mixer 422 is zero and the average output of accumulator 430 is proportional to the free spectral range. The register 440 outputs a digital signal (B) with a digital value that is proportional to frequency Δf to the adder 435 and to the subtractor 436. A summed signal (A+B=C), which is proportional to the frequency $f_{FSR}+\Delta f$, is output from the adder 435 to the switch 450 and a differenced signal (A−B=D), which is proportional to $f_{FSR}-\Delta f$, is output from the subtractor 435 to the switch 450. The switch 450 switches at a frequency $f_{FM}$ set by the clock 445 to alternately output either the summed signal C or the differenced signal D. The output from the switch 450 is split into two digital signals. The first signal is a digital output data representing a value that is proportional to the frequency $f_{mod+}=f_{FSR}+\Delta f$ or $f_{mod-}=f_{FSR}-\Delta f$ (depending on the state of the switch 450) to the CW PDH modulation generator 102. The second signal is a digital output data representing a value that is proportional to the frequency $2f_{mod+}=2f_{FSR}+2\Delta f$ or $2f_{mod-}=2f_{FSR}-2\Delta f$ (depending on the state of the switch 450) to the CW PDH modulation generator 102.

In the FSR-detection-and-servo electronics 252, the ADC 410 inputs voltage signals from the CCW transmission detector 116. The output from the ADC 410 is sent to the first digital mixer 421 to be mixed with signal occurring at twice the PDH modulation frequency. The output of the first mixer 421 is input to the second mixer 422 to be mixed with the clock signal from the clock 445. The clock 445 controls a switching frequency as described above. The output from the second mixer 422 is sent to the accumulator 430. The accumulator 430 outputs a signal (A) to the adder 435 and the subtractor 436, which function as described above. The output from the switch 450 is split into the first and second digital signals (as described above) which are output to the CCW PDH modulation generator 101.

The first and second demodulators 421 and 422 are digital multipliers. The output of the second demodulator 422 is accumulated (approximate integration) by the accumulator 430, which acts as a servo. The output of the second demodulator 422 is a digital value that corresponds to a deviation away from the free spectral range (FSR). The accumulator 430 controls the PDH modulation frequency to keep the second demodulator output at a zero mean. The output of the accumulator 430 is a digital value that corresponds to the FSR. The output of the accumulator 430 goes to both the adder 435 and the subtractor 436, where it is either added to or subtracted from a digital value that corresponds to a small constant frequency shift (Δf). In one implementation of this embodiment, the small constant frequency shift (Δf) is approximately equal to a half line-width of the gyro resonator resonance peak. In another implementation of this embodiment, the small constant frequency shift (Δf) is less than a half line-width of the gyro resonator resonance peak. The digital value Δf is programmed into the device memory (register 440) when the RFOG 10 is first built. The clock 445 at $f_{FM}$ is generated by digital electronics. In one implementation of this embodiment, the clock is generated by a direct digital synthesizer (DDS). The clock 445 at $f_{FM}$ controls the switch 450 that has an output that switches from either the adder 435 or the subtractor 436. Therefore, the output of the switch 450 is a digital value that represents the PDH modulation frequency that is either at the FSR plus Δf (i.e., $f=f_{FSR}+\Delta f$) or the FSR minus Δf (i.e., $f=f_{FSR}-\Delta f$). The PDH modulation generates first order, upper and lower sidebands about the optical carrier. The terms "carrier", "laser carrier", and "carrier frequency" are used interchangeably herein. Depending on the state of switch 450, the upper and lower modulation sidebands are separated from the carrier by either FSR plus Δf or FSR minus Δf.

The switch output is also sent to the multiplier 451 that multiplies it by the integer 2. This can be simply done with a level shift, moving the bits of the digital value up one higher level. The digital values output from the FSR-detection-and-servo electronics 202 and 252 go the PDH modulation generators 102 and 101, respectively.

Figure 3:
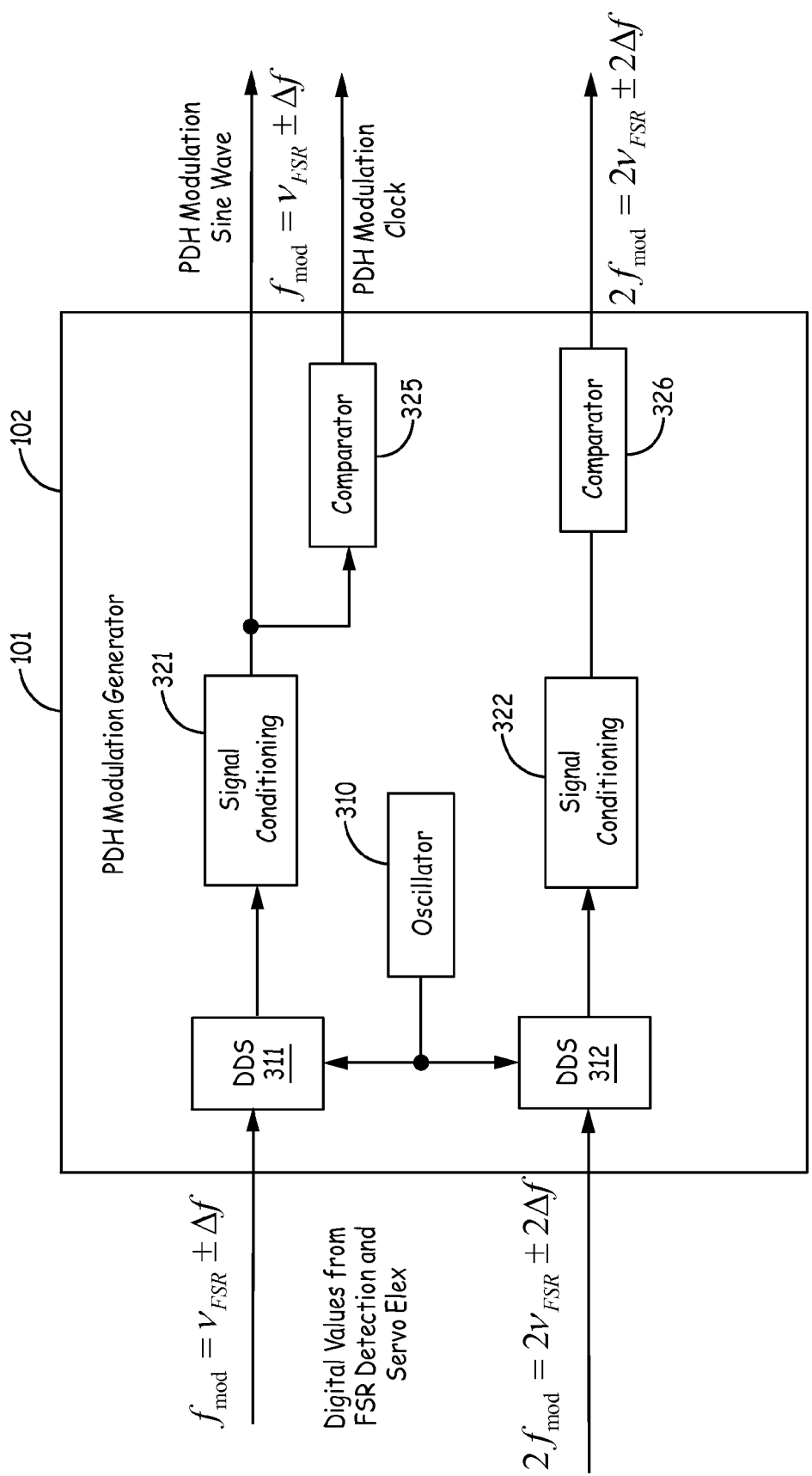
FIG. 3 is a block diagram of one embodiment of a Pound-Drever-Hall (PDH) modulation generator in the RFOG of FIG. 1 in accordance with the present invention.

FIG. 3 is a block diagram of one embodiment of a Pound-Drever-Hall (PDH) modulation generator 101 and 102 in the RFOG 10 of FIG. 1 in accordance with the present invention. Each of the PDH modulation generators 101 and 102 includes: a clock 310 (oscillator 310); first and second direct digital synthesizers (DDS) 311 and 312, respectively; first and second signal conditioning modules 321 and 322, respectively; and first and second comparators 325 and 326, respectively. The operation of the PDH modulation generator 102 is now described.

The output from the FSR-detection-and-servo electronics 202 is input to the CW PDH modulation generator 102. The frequency $f_{mod\pm}$ is referred to herein as the "PDH modulation frequency" or the "modulation frequency". The first digital data representing frequency $f_{mod\pm}=f_{FSR}+\Delta f$ output from the FSR-detection-and-servo electronics 202 is input at the first DDS 311 in the CW PDH modulation generator 102. The second digital data representing frequency $2f_{mod\pm}=2f_{FSR}\pm2\Delta f$ output from the FSR-detection-and-servo electronics 202 is input at the second DDS 312 in the CW PDH modulation generator 102. The first and second direct digital synthesizers 311 and 312 each input a signal from a common clock 310. By using a common clock 310 for both DDS 311 and DDS 312, the frequency outputs from PDH modulation generator 102 are synchronized and have a fixed phase relationship. The clock 310 is also referred to herein as "direct-digital-synthesizer clock 310."

The first DDS 311 outputs an analog sine wave voltage at the PDH modulation frequency ($f_{mod\pm}$) to the first signal conditioning module 321. The second DDS 312 outputs a digital reference signal at exactly twice the PDH modulation frequency ($2f_{mod\pm}$) to the second signal conditioning module 322. The signal conditioning 321 and 322 provides filtering to remove unwanted signals generated by the DDS process (known to one skilled in the art as reconstruction filtering) and to provide necessary gain to obtain the required amplitude. The output of the signal conditioning 321 from a first port of the CW PDH modulation generator 102 provides the PDH modulation. The first signal conditioning 321 in the CW PDH modulation generator 102 sends a signal at frequency $f_{mod\pm}=f_{FSR}\pm\Delta f$ to the CW phase modulator 112 via the first port. The second signal conditioning 322 in the CW PDH modulation generator 102 sends a signal at frequency $2f_{mod\pm}=2f_{FSR}\pm2\Delta f$ to the comparator 326 that provides a digital reference signal for demodulation at twice the PDH modulation frequency.

The output of the signal conditioning 321 is split so signals also go to the comparator 325. The output of the signal conditioning 322 goes directly to comparator 326.

The comparators 325 and 326 convert the sine waves, which are input from the first and second signal conditional models 321 and 322, to a square wave that is used as a clock for the digital signal processing. For example, the clock can be used as the reference signals going to the demodulators (mixers) in the associated FSR-detection-and-servo electronics 202 and the associated bias correction electronics 204. The output from the first comparator 325 is sent to a PDH modulation clock (not shown) used by bias correction electronics 204 shown in FIG. 4A. The output from the second comparator 326 is sent to a 2×PDH modulation clock (not shown) used by the FSR-detection-and-servo electronics 202. Since the PDH modulation generator 102 is similar in structure and function to the PDH modulation generator 101, the CCW PDH modulation generator 101 operates, in like manner, with the associated and communicatively coupled CCW phase modulator 111, second FSR-detection-and-servo electronics 252, and bias correction electronics 254.

In one implementation of this embodiment, the CCW PDH modulation generator 101 and the CW PDH modulation generator 102 each generate a different $\Delta f$. In this case, $\Delta f$ in the CW PDH modulation generator 102 is a first delta ($\Delta f_1$) so that frequency $f_{1\ mod\pm}=f_{FSR}\pm\Delta f_1$ is output from the CW PDH modulation generator 102. Similarly, $\Delta f$ in the CCW PDH modulation generator 101 is a second delta ($\Delta f_2$) so that frequency $f_{2\ mod\pm}=f_{FSR}\pm\Delta f_2$ is output from the CCW PDH modulation generator 101. In another implementation of this embodiment, the CCW PDH modulation generator 101 and the CW PDH modulation generator 102 each generate the same $\Delta f$.

In prior art systems, the lasers are modulated with high precision to keep modulation errors at a minimum (e.g., the modulation imperfections are small). This technique described herein cancels errors due to imperfection in the modulation so the laser modulation does not require high precision of prior art systems.

Figure 4A:
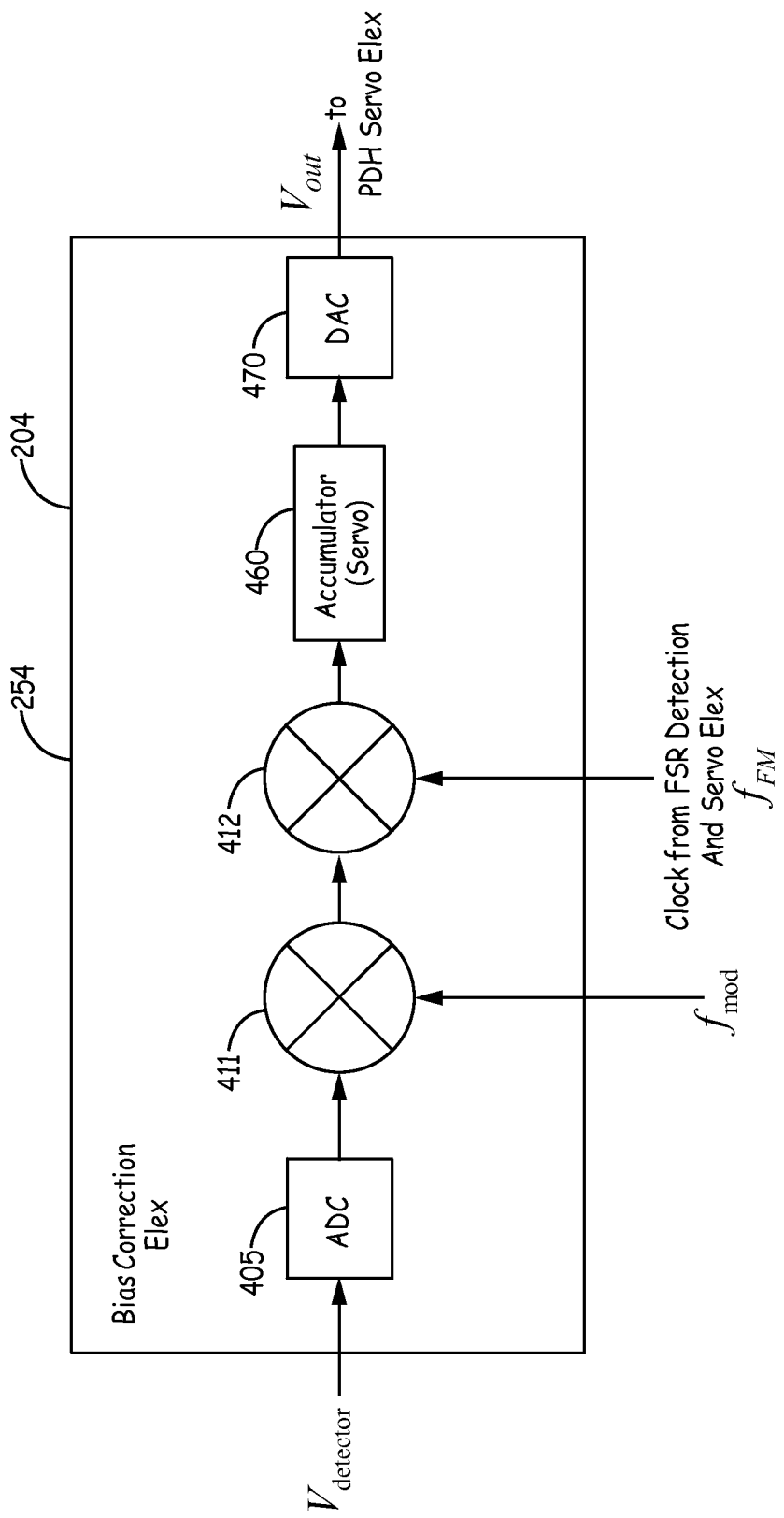
FIGS. 4A and 4B are block diagrams of embodiments of bias correction electronics in the RFOG of FIG. 1 in accordance with the present invention.
Figure 4B:
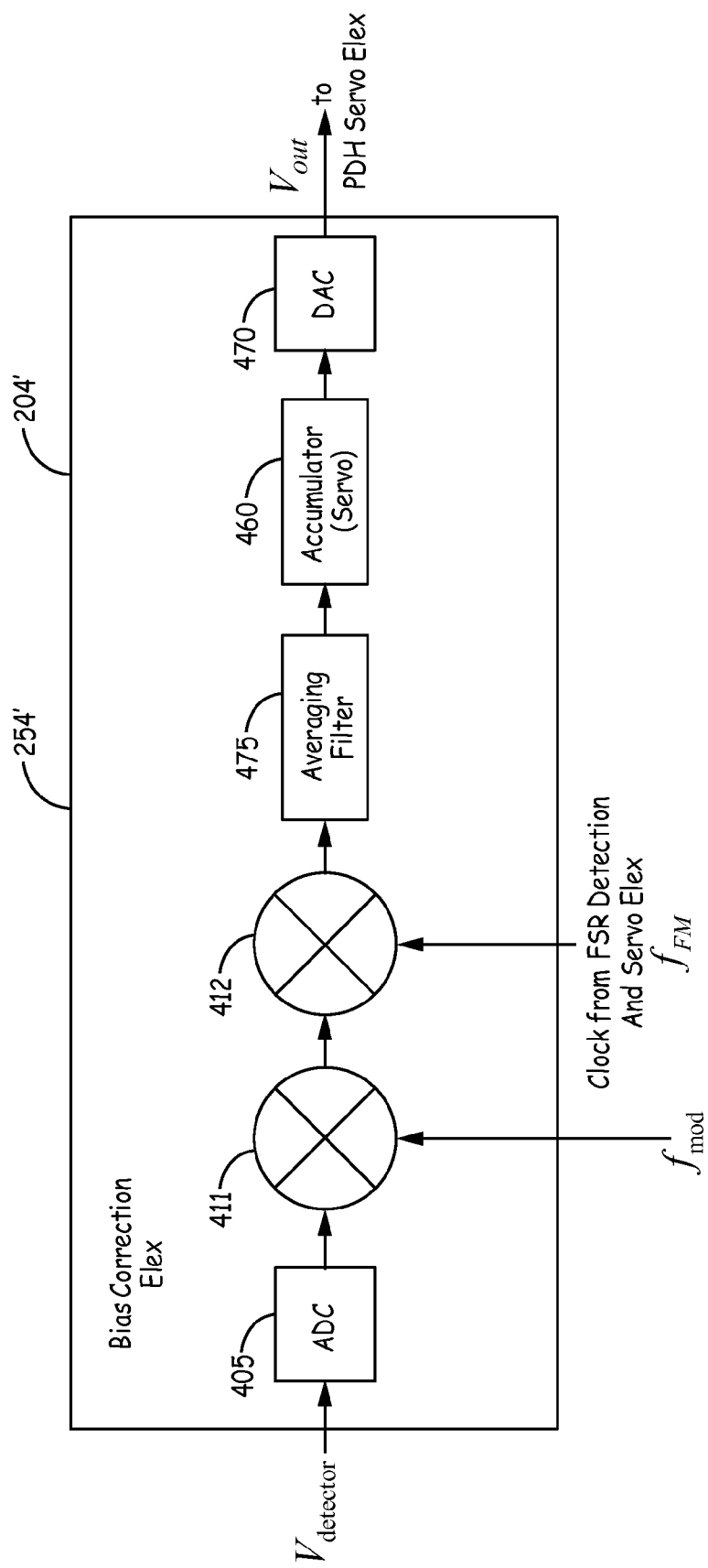

FIGS. 4A and 4B are block diagrams of embodiments of bias correction electronics in the RFOG 10 of FIG. 1 in accordance with the present invention. FIG. 4A is a block diagram of bias correction electronics 204 and 254 in the RFOG 10. The bias correction electronics 204 and 254 detect light from the transmission ports 151 and 152, respectively, of the gyro resonator 150 (FIG. 1). Each of the bias correction electronics 204 and 254 include an analog-to-digital converter (ADC) 405, a first digital mixer 411, a second digital mixer 412, an accumulator (servo) 460, and a digital-to-analog convertor (DAC) 470.

The operation of the bias correction electronics 204 is now described. A voltage signal output from the CW transmission detector 115 is input to the ADC 405. The output from the ADC 405 is input to the first digital mixer 411 to be mixed with a reference signal at the modulation frequency $f_{mod}$. The output from the first digital mixer 411 is input to the second digital mixer 412 to be mixed with the clock signal from the clock 445 in the FSR-detection-and-servo electronics 202 (FIG. 2) occurring at the frequency $f_{FM}$. The output from the second digital mixer 412 is input to the accumulator 460. The output from the accumulator 460 is input to the DAC 470. The output from the DAC 470 is input to the communicatively coupled CW PDH servo electronics 206.

The output of the second digital mixer 412 is a digital value that represents the bias error in the PDH servo electronics 206 and 256. This bias error is an error in detecting the resonance frequency of the gyro resonator 150, and shows up as a rotation rate bias error. The bias error can be due to a number of sources, such as intensity modulation, second harmonic distortion of the PDH modulation, and PDH servo offset errors. The accumulator 460 controls the PDH loop locking set point to keep the output of the second digital mixer 412 to a zero mean, thus the bias error is controlled to a zero mean. The output of the accumulator 460 is converted to an analog voltage by the DAC 470.

Since the bias correction electronics 254 is similar in structure and function to the bias correction electronics 204, the bias correction electronics 254 operate in like manner with the associated and communicatively coupled CCW photodetector 116 and the CCW PDH servo electronics 256.

FIG. 4B is a block diagram of bias correction electronics 254' and 204'. The structure of the bias correction electronics 254' and 204' differ from the bias correction electronics 254 and 204 in that an averaging filter 475 inputs the signal from the second digital mixer 412 and outputs signals to the accumulator servo 460. The averaging filter 475 removes the intensity modulation error signal (or other error signals). The function of bias correction electronics 254' and 204' are similar to the bias correction electronics 254 and 204 described above. In one implementation of this embodiment, the bias correction electronics 254' and 204' replace the bias correction electronics 254 and 204 in the RFOG 10 (FIG. 1).

Figure 5A:
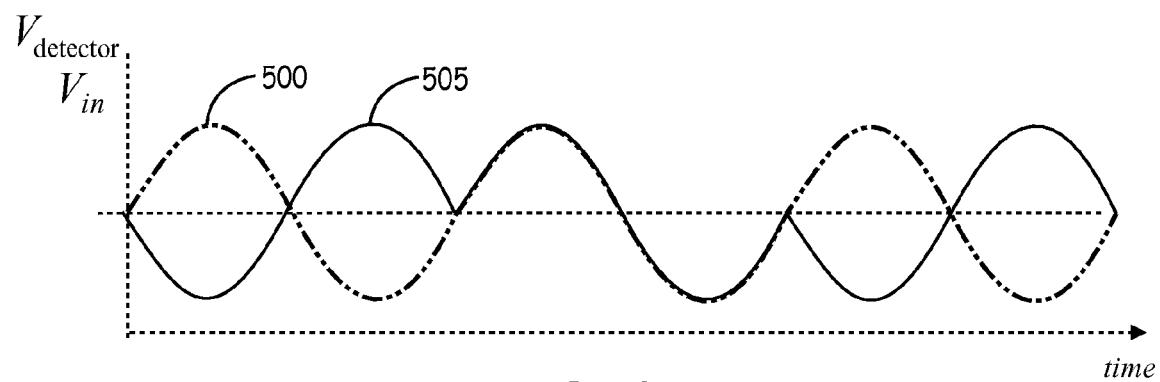
FIG. 5A shows the voltage signal output from the transmission detectors in the RFOG of FIG. 1 in accordance with the present invention.

FIG. 5A shows the voltage signal output from the transmission detectors 115 and 116 in the RFOG 10 of FIG. 1 in accordance with the present invention. The voltage signal is also referred to herein as a "resonator signal". For discussion purposes, the signals are deconstructed into two signals 500 (dashed line) and 505 (solid line) plotted versus time. Signal 500 represents the signal output from the transmission detectors 115 and 116 that is due to unwanted intensity modulation, which is a byproduct of imperfect phase modulation. Signal 505 represents the ideal resonator signal at the PDH modulation frequency when the carrier frequency is slightly off resonance of the gyro resonator 150. The signal 505 has a non-zero amplitude when the laser carrier is slightly off resonance, and has a zero amplitude when the laser carrier is on resonance. Detecting the null in the amplitude of signal 505 is key to accurately locking the laser onto the gyro resonator 105 resonance frequency and accurately measuring rotation. Without switching the modulation frequency (between $f_{mod+}$ and $f_{mod-}$) there is no way to distinguish between the intensity modulation signal 500 and the ideal resonator signal 505. However, the switching of the PDH modulation frequency between $f_{mod+}=f_{FSR}+\Delta f$ and $f_{mod-}=f_{FSR}-\Delta f$ causes the phase (but not the amplitude) of the voltage signal 505 output from the gyro resonator 150 to switch from in-phase to 180 degrees out of phase relative to a modulation reference. For simplicity, FIG. 5A shows the voltage signal 505 switching phase every period of signal 505. In practice, the phase switching would occur for a large number of periods of signal 505.

Figure 5B:
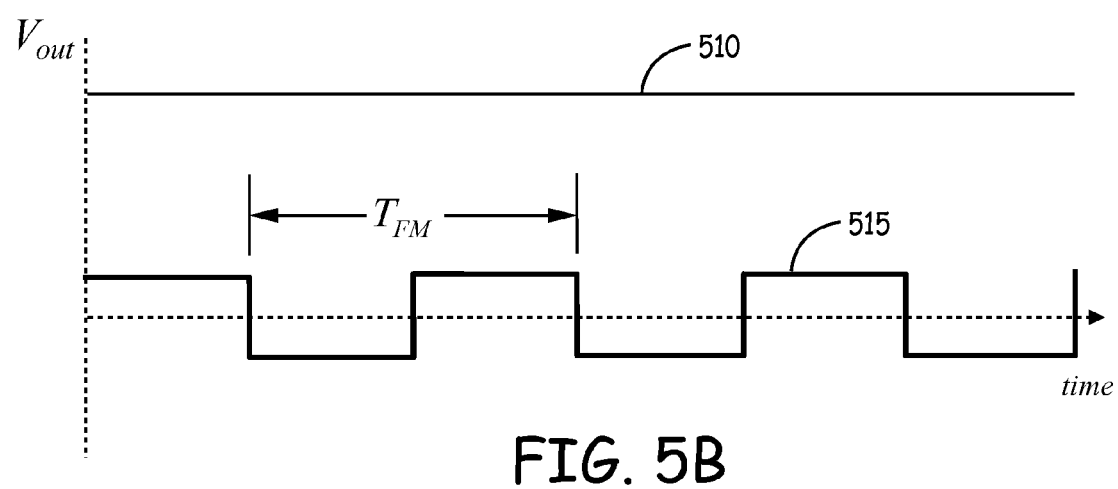
FIG. 5B shows the voltage signal output from the second digital mixer in the bias correction electronics of FIGS. 4A and 4B in accordance with the present invention.

FIG. 5B shows the voltage signal output from the second digital mixer 412 in the bias correction electronics of FIGS. 4A and 4B in accordance with the present invention. Again, the twice demodulated signal is deconstructed into two different signals. The signal 515 is the twice demodulated signal due to intensity modulation and always has a zero mean. The accumulator 460 (FIGS. 4A and 4B) filters out the square wave due to intensity modulation. The signal 510 is the twice demodulated resonator signal when the laser frequency is slightly off resonance and is greater than zero in this example. Any bias error due to intensity modulation is the same for $f_{mod+}$ and $f_{mod-}$ and cancels out. The intensity modulation error is removed by various methods, such as averaging over an integer number of FM cycles or by low-pass filtering the output of the second demodulator. When the square wave is filtered, the resonator signal with information indicative of rotation is obtained.

Figure 7A:
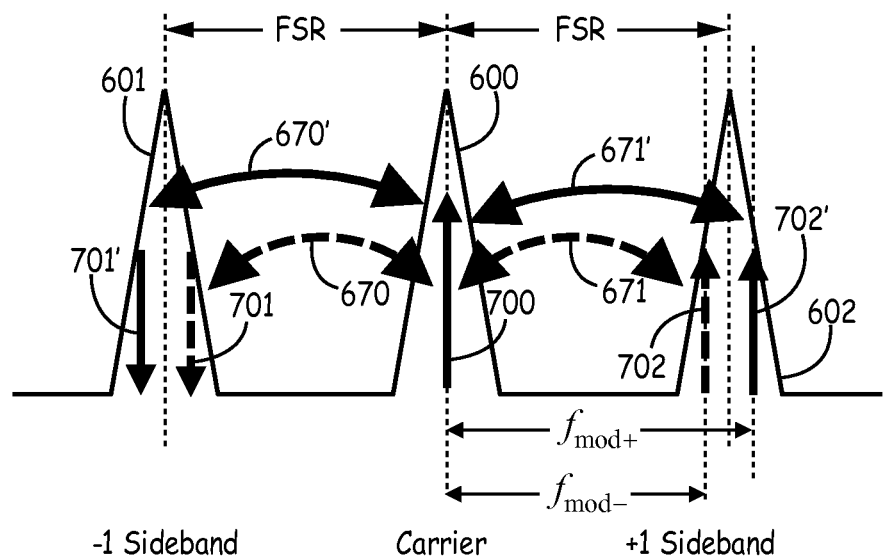
FIGS. 7A-7B show exemplary vector arrows representing the frequency, amplitude, and phase of optical signals relative to resonance peaks in accordance with the present invention.
Figure 7B:
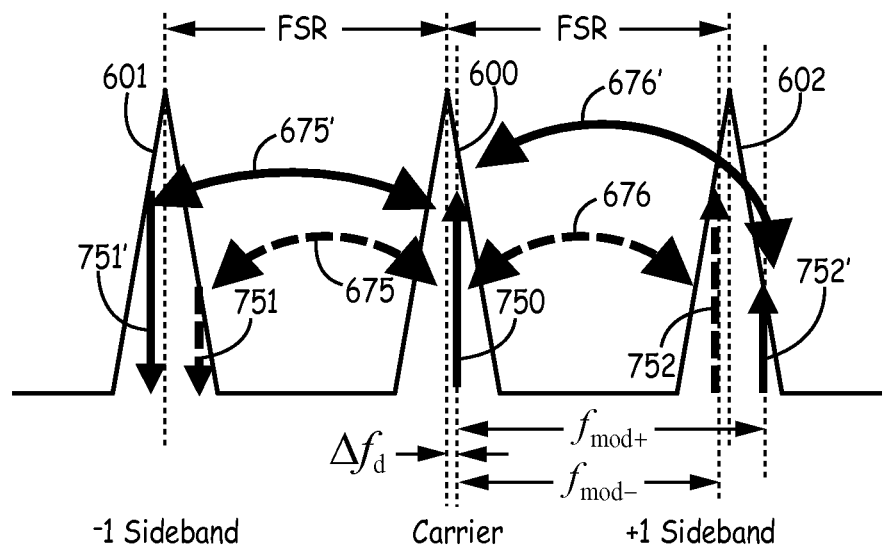

FIGS. 6A and 6C show exemplary vector arrows representing the frequency, amplitude and phase of optical signals relative to resonance peaks in accordance with the present invention. FIGS. 6B and 6D show modulator output signals associated with respective optical signals of FIGS. 6A and 6C for measuring free spectral range in accordance with the present invention. FIGS. 7A-7B show exemplary vector arrows representing the frequency, amplitude and phase of optical signals relative to resonance peaks in accordance with the present invention. In FIGS. 6A, 6C, 7A, and 7B, the resonance peaks of the gyro resonator 150 with an average modulation frequency $f_{FSR}$ are shown as peaks 600, 601, and 602. In FIGS. 6A, 6C, and 7A, the carrier frequency is indicated by the arrow labeled 700 in the resonance peak 600. The first lower sidebands of the carrier frequency 700 (at the down-shifted frequency) are indicated by the arrows 701 and 701' in the first resonance peak 601 below the resonance peak 600. The first higher sidebands of the carrier frequency 700 (at the up-shifted frequency) are indicated by the arrows 702 and 702' in the first resonance peak 602 above the resonance peak 600. The direction of the arrows (up or down) represents either a 0 degree or 180 degree phase of the optical signal.

In FIG. 7B, the carrier frequency is indicated by the arrow labeled 750 in the resonance peak 600. The first lower sidebands of the carrier frequency 750 (at the down-shifted frequency) are indicated by the arrows 751 and 751' in the first resonance peak 601 below the resonance peak 600. The first higher sidebands of the carrier frequency 750 (at the up-shifted frequency) are indicated by the arrows 752 and 752' in the first resonance peak 602 above the resonance peak 600.

FIGS. 6A-6D indicate how the RFOG 10 of FIG. 1 provides a way to measure the FSR of the gyro resonator 150. In FIG. 6A, the average modulation frequency is equal to the resonator FSR. In FIG. 6A, the beat between the upper and lower sidebands 701 and 702 for a frequency modulation of $f_{mod-}$ is indicated by the curved arrow 650. Thus, the beat between the upper and lower sidebands 701 and 702, when the average modulation frequency is equal to the resonator FSR and when the frequency modulation is $f_{mod-}$, is referred to herein as beat 650. In FIG. 6A, the beat between the upper and lower sidebands 701' and 702' for a frequency modulation of $f_{mod+}$ is indicated by the curved arrow 650'. Thus, the beat between the upper and lower sidebands 701' and 702', when the average modulation frequency is equal to the resonator FSR and when the frequency modulation is $f_{mod+}$, is referred to herein as beat 650'. The terms "beat", "beat note", and "beat signal" are used interchangeably herein.

In FIG. 6B, the detector output signal (from the transmission detector 115 of FIG. 1) for the beat 650' (FIG. 6A) for $2f_{mod+}$ is shown as signal 680 (solid line). In FIG. 6B, the detector output signal (from the transmission detector 115 of FIG. 1) for the beat 650 (FIG. 6A) for $2f_{mod-}$ is shown as signal 681 (dashed line). When the average modulation frequency is equal to the resonator FSR, the amplitudes of the beat signals 680 and 681 are equal. Thus, the twice demodulated detector signal, which is the average output from the 2f demodulator (i.e., the second mixer 422 in the FSR-detection-and-servo electronics of FIG. 2) is zero.

In FIG. 6C, the average modulation frequency is slightly less than the resonator FSR at $f_{FSR}-\delta f$. The upper and lower sidebands 702 and 701 are further away from resonance center than the upper and lower sidebands 702' and 701'. The beat between the upper and lower sidebands 701 and 702, when the average modulation frequency is slightly less than the resonator FSR (e.g., $f_{FSR}-\delta f$) and when the frequency modulation is $f_{mod-}$, is referred to herein as beat 655. The beat between the upper and lower sidebands 701' and 702', when the average modulation frequency is equal to the resonator is slightly less than the resonator FSR (e.g., $f_{FSR}-\delta f$) and when the frequency modulation is $f_{mod+}$, is referred to herein as beat 655'.

In FIG. 6D, the detector output signal (from the transmission detector of FIG. 1) for the beat 655' for $2f_{mod+}$ (FIG. 6C) is shown as signal 685 (solid line). In FIG. 6B, the detector output signal (from the transmission detector of FIG. 1) for the beat 655 for $2f_{mod-}$ (FIG. 6C) is shown as signal 686 (dashed line). The amplitudes of the signals 685 and 686 are not equal due to the shift in the sidebands by $\delta f$. Thus, the twice demodulated detector signal which is the output from the 2f demodulator (i.e., the second mixer 422 in the FSR-detection-and-servo electronics of FIG. 2) is not zero, which indicates the average modulation frequency is deviating away from the free spectral range of the gyro resonator 150 (FIG. 1).

FIGS. 7A and 7B indicate how the RFOG 10 of FIG. 1 provides a way to reject some bias errors. FIG. 7A shows how the carrier 700 on resonance condition is indicated by a null resonator signal for both modulation frequencies $f_{mod+}$ and $f_{mod-}$. FIG. 7A shows the carrier 700 on resonance and modulation sidebands 701' and 702' (at the down-shifted frequency and up-shifted frequency, respectively) when the PDH modulation frequency is $f_{mod+}$ and modulation sidebands 701 and 702 (at the down-shifted frequency and up-shifted frequency, respectively) when the PDH modulation frequency is $f_{mod-}$.

When the carrier 700 is on resonance and the modulation frequency is $f_{mod+}$, the beat between the carrier 700 and the lower sideband 701' is indicated by curved arrow 670' and the beat between the carrier 700 and upper sideband 702' is indicated by curved arrow 671'. Thus, the beat between the lower sideband 701' and the carrier 700, when the carrier 700 is on resonance, is referred to herein as beat 670'. Likewise, the beat between the upper sideband 702' and the carrier 700, when the carrier 700 is on resonance, is referred to herein as beat 671'. When the carrier 700 is on resonance and the modulation frequency is $f_{mod+}$, the amplitudes of the two beat signals 670' and 671' are exactly equal, but their relative phase is 180 degrees and therefore the two beat signals 670' and 671' cancel out to provide a null signal, which is an accurate indication that the laser carrier 700 is on resonance.

When the carrier 700 is on resonance and the modulation frequency is $f_{mod-}$, the situation looks the same. The beat between the carrier 700 and the lower sideband 701 is indicated by curved arrow 670 and the beat between the carrier 700 and upper sideband 702 is indicated by curved arrow 671. Thus, the beat between the lower sideband 701 and the carrier 700, when the carrier 700 is on resonance, is referred to herein as beat 670. Likewise, the beat between the upper sideband 702 and the carrier 700, when the carrier 700 is on resonance, is referred to herein as beat 671. When the carrier 700 is on resonance and the modulation frequency is $f_{mod-}$, the amplitudes of the two beat signals 670 and 671 are exactly equal, but their relative phase is 180 degrees and therefore the two beat signals 670 and 671 cancel out to provide a null signal, which is an accurate indication that the laser carrier 700 is on resonance.

FIG. 7B shows how switching the PDH modulation frequency from $f_{mod+}$ and $f_{mod-}$ modulates the signal used for detecting when the laser carrier 700 is off resonance. Modulation of the resonance detection signal provides a way to discriminate between the true resonance detection signal and any errors that are not modulated by the switching of the PDH modulation frequency. In FIG. 7B, the laser carrier 750 is slightly off resonance by $\Delta f_d$, so the carrier frequency represented generally by vector arrow 750 is offset from the peak of the resonance peak 600 by $\Delta f_d$. This causes the lower sideband frequencies 751' and 751 (at the down-shifted frequency) and the higher sideband frequencies, 752' and 752 (at the up-shifted frequency) to be shifted by $+\Delta f_d$ within the resonance peaks 601 and 602, respectively. When the PDH modulation frequency is $f_{FSR}+\Delta f$, the lower sideband 751' is closer to the resonance peak and therefore has a larger amplitude after passing through the resonator than the upper sideband 752', which is farther away from the resonance peak.

The beat signal between the lower sideband 751' and the carrier 750 is indicated by the curved arrow 675' and beat signal between the upper sideband 752' and the carrier 750 is indicated by the curved arrow 676' when the PDH modulation frequency is $f_{mod+}$. Thus, the beat between the lower sideband 751' and the carrier 750, when the laser carrier 750 is slightly off resonance by $\Delta f_d$ and the PDH modulation frequency is $f_{mod+}$, is referred to herein as beat 675'. Likewise, the beat between the upper sideband 752' and the carrier 750, when laser carrier 750 is slightly off resonance by $\Delta f_d$ and the PDH modulation frequency is $f_{mod+}$, is referred to herein as beat 676'.

When the laser carrier 750 is slightly off resonance (e.g., by $+\Delta f_d$) and the PDH modulation frequency is $f_{mod+}$ (i.e., $f_{FSR}+\Delta f$), the amplitude of the beat signal 675' is larger than amplitude of the beat signal 676'. Even though the two beat signals 675' and 676' have opposite signs, they do not have the same amplitude and therefore do not cancel each other out and together they produce a resulting signal with a non-zero amplitude, which indicates the laser carrier 750 is slightly off resonance.

The situation is similar for the case when the PDH modulation frequency is $f_{mod-}$ (i.e., $f_{FSR}-\Delta f$), but the resulting signal indicating the laser carrier being slightly off resonance has a sign that is opposite to the resulting signal in the $f_{mod+}$ case. The lower sideband 751 is now farther from the resonance peak and therefore has a smaller amplitude after passing through the resonator than the upper sideband 752, which is now closer to the resonance peak.

The beat signal between the lower sideband 751 and the carrier 750 is indicated by the curved arrow 675 and beat signal between the upper sideband 752 and the carrier 750 is indicated by the curved arrow 676. Thus, the beat between the lower sideband 751 and the carrier 750, when the laser carrier 750 is slightly off resonance by $\Delta f_d$ and the PDH modulation frequency is $f_{mod-}$, is referred to herein as beat 675. Likewise, the beat between the upper sideband 752 and the carrier 750, when laser carrier 750 is slightly off resonance by $\Delta f_d$ and the PDH modulation frequency is $f_{mod-}$, is referred to herein as beat 676. Even though the two beat signals 675 and 676 have opposite signs, they do not have the same amplitude and therefore do not cancel each other out and together produce a resulting signal with a non-zero amplitude, which indicates the laser being slightly off resonance.

However, the signal indicating the laser carrier 750 is slightly off resonance when the PDH modulation is $f_{mod-}$ is opposite to the sign of the signal in indicating the laser carrier being slightly off resonance when the PDH modulation is $f_{mod+}$. When the PHD modulation frequency is periodically switched between $f_{mod+}$ and $f_{mod-}$ at some switching frequency (FM), the sign of the signal indicating when the laser carrier 750 is slightly off resonance is modulated at the switching frequency (FM). The switching of the sign of the resonance detection signal provides a way to discriminate between the real resonance detection signal and any unwanted errors that do not get modulated by the switching.

In order to measure the FSR, the first demodulator 421 in the FSR-detection-and-servo electronics 202 and 252 is demodulating at twice the modulation frequency. The optical beam 126 from the CW laser 106 is modulated for a first period of time (e.g., $\Delta T_1=5$ seconds) at $f_{mod+}$ and then after 5 seconds, the CW laser 106 is modulated for a next second period of time (e.g., $\Delta T_2=5$ seconds) at $f_{mod-}$ and then the CW laser 106 is modulated for a third period of time (e.g., $\Delta T_3=5$ seconds) at $f_{mod+}$, etc. The RFOG 10 detects the beating between the upper and lower sidebands, which is at twice the modulation frequency of $f_{FSR}\pm\Delta f$, since the sidebands are separated by 2×FSR. When the switch 450 (FIG. 2) switches state, the amplitude of the signal at twice the PDH modulation frequency changes if the FSR of the gyro resonator 150 has changed during the time $\Delta T$. In this manner, the RFOG 10 detects changes in the FSR of the gyro resonator 150.

If both the CW path and the CCW path are modulated, then, simultaneously, the optical beam 125 from the CCW laser 105 is modulated for the first period of time (e.g., $\Delta T_1=5$ seconds) at $f_{mod-}$ and then after 5 seconds, the CCW laser 105 is modulated for the second period of time (e.g., $\Delta T_2=5$ seconds) at $f_{mod+}$ and then the CCW laser 105 is modulated for a period of time (e.g., $\Delta T_3=5$ seconds) at $f_{mod-}$, etc.

Referring back to FIG. 6D, the signal at twice the PDH modulation frequency (i.e., the signals 685 and 686) is run through the first demodulator 421 in the FSR-detection-and-servo electronics 202 and 252 (FIG. 2) to measure the amplitude of the beat frequency. The output of the first demodulator 421 modulator shifts from a higher value to a lower value. The shift occurs at the same time the modulation frequency on the optical beam is switched.

The second demodulator 422 in the FSR-detection-and-servo electronics 202 and 252 (FIG. 2) demodulates at the switching frequency $f_{FM}$. Thus, second demodulator 422 provides an output signal proportional to the deviation from the FSR. The output from the second demodulator 422 is zero when the average mod frequency is at the FSR or a multiple of the FSR. The error signal from the second demodulator 422 goes to an accumulator, which acts as a servo to control the average modulation frequency to be equal to the gyro resonator FSR.

In one implementation of this embodiment, the FSR of the gyro resonator 150 is 1 MHz, the $f_{mod+}=f_{FSR}+\Delta f$ is 1.1 MHz and $f_{mod+}=f_{FSR}-\Delta f$ is 0.9 MHz.

The RFOG 10 rejects imperfections in the two-laser system. System 20 modulates the PDH modulation frequencies in a manner that modulates the resonance detection signal, but does not modulate the bias errors associated with modulation imperfections, and therefore provides a means to discriminate between the wanted resonance detection signal and the unwanted bias errors. The modulation of the resonance detection signal was discussed earlier. The following discussion focuses on how the bias errors due to modulation imperfections (intensity modulation and second harmonic distortion) do not get modulated by the modulation of the PDH modulation frequency.

Figure 8:
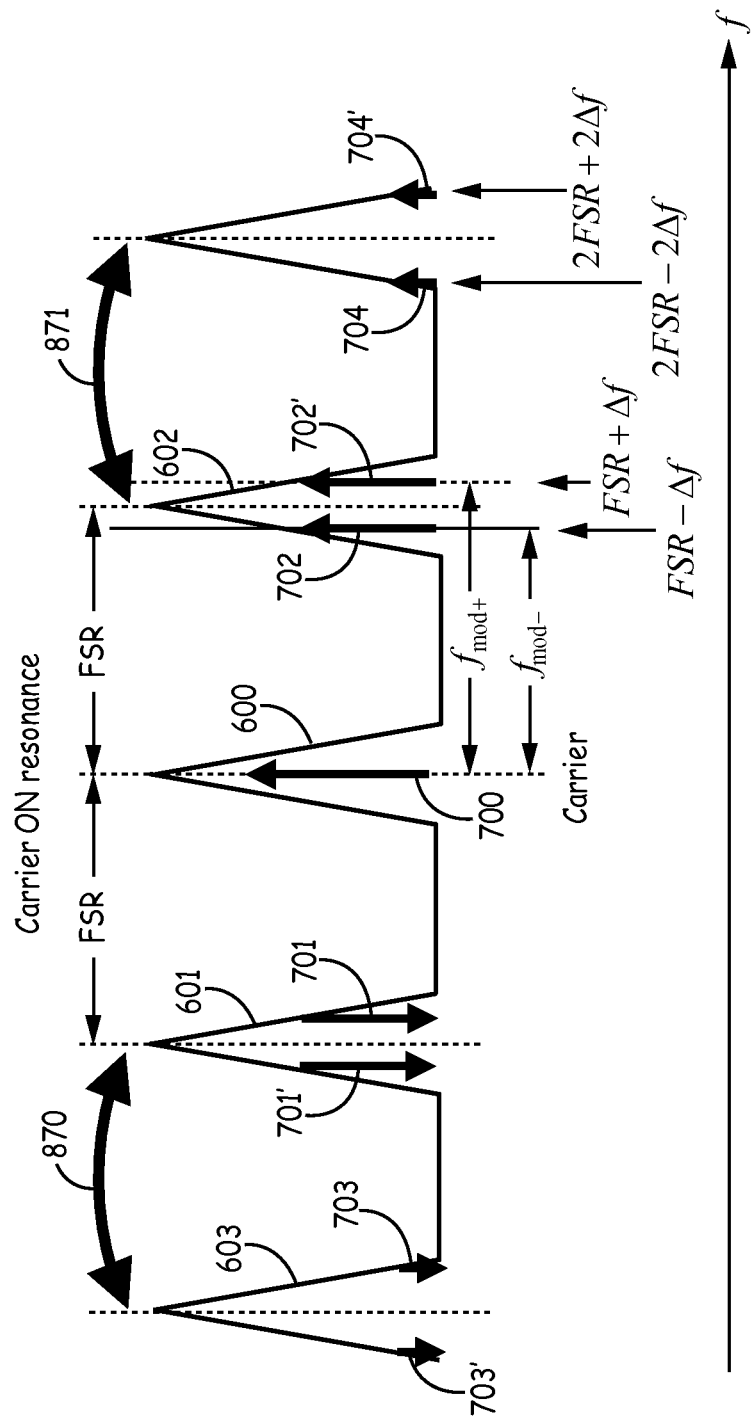
FIG. 8 shows exemplary vector arrows representing the frequency, amplitude, and phase of optical signals relative to resonance peaks in accordance with the present invention.

FIG. 8 shows exemplary vector arrows representing the frequency, amplitude and phase of optical signals relative to resonance peaks in accordance with the present invention. The frequency, amplitude and phase of optical signals are due to intended PDH modulation and imperfections due to second harmonic distortion. The laser carrier 700, which is centered at resonance peak 600, has second lower sidebands 703, 703' (due to non-linearity of the modulation process) in the resonance peak 603, which is two FSR below the resonance peak 600 of the carrier 700. The second upper sidebands 704, and 704' of the laser carrier 700 (due to non-linearity of the modulation process) are the at the resonance peak 604, which is two FSR above the resonance peak 600 of the carrier 700. The sidebands 701', 702', 703' and 704' correspond to when the PDH modulation frequency is $f_{FSR}+\Delta f$, and the sidebands 701, 702, 703 and 704 correspond to when the PDH modulation frequency is $f_{FSR}-\Delta f$. When the laser carrier 700 frequency is on resonance, the beat signals between sidebands 701' and 702' and the laser carrier 700 cancel each other out as discussed earlier. Likewise, when the laser carrier 700 frequency is on resonance, the beat signals between sidebands 701 and 702 and the laser carrier 700 cancel each other out. A null signal indicates when the laser carrier 700 is on resonance.

However, the sidebands generated by second harmonic distortion generate beat signals that do not cancel out when the laser carrier is on resonance and therefore result in a rotation sensing error. The beat signal between 703' and 701' (represented generally as beat 870) has the same sign as the beat signal between 704' and 702' (represented generally as beat 871) and therefore do not cancel out. Likewise, the beat signal 870 between 703 and 701 has the same sign as the beat signal 871 between 704 and 702 and therefore they do not cancel out. For each of the PDH modulation frequencies $f_{FSR}+\Delta f$ and $f_{FSR}-\Delta f$ there is a bias error resulting from second harmonic distortion. However, as long as the resonance peaks are symmetric and the average PDH modulation frequency is at a resonator FSR, the bias errors have the same amplitude and therefore are not modulated by switching the PDH modulation frequency. Since the gyro resonator FSR can change with temperature or other environmental changes, the control of the average PDH modulation frequency to the FSR by the FSR-Detection-and-servo electronics is important to maintain good rejection of second harmonic distortion errors. The resonator signal, after being digitized by ADC 405 in the bias correction electronics 204 and 254, is demodulated by first digital mixer 411 (FIG. 4A). The wanted resonance detection signal after digital mixer 411 is modulated at the switching frequency $f_{FM}$, whereas the unwanted signal due to second harmonic distortion is constant or dc after the digital mixer 411. The wanted resonance detection signal is demodulated to dc after the second digital mixer 412, whereas the unwanted signal due to second harmonic distortion is up-converted in frequency from dc to the switching frequency $f_{FM}$ after the second digital mixer 412. The switching frequency $f_{FM}$ is chosen such that the bias error can be easily filtered or subtracted out. The errors from intensity modulation generated by the PDH frequency modulation are likewise rejected as is understandable to one skilled in the art.

Figure 9:
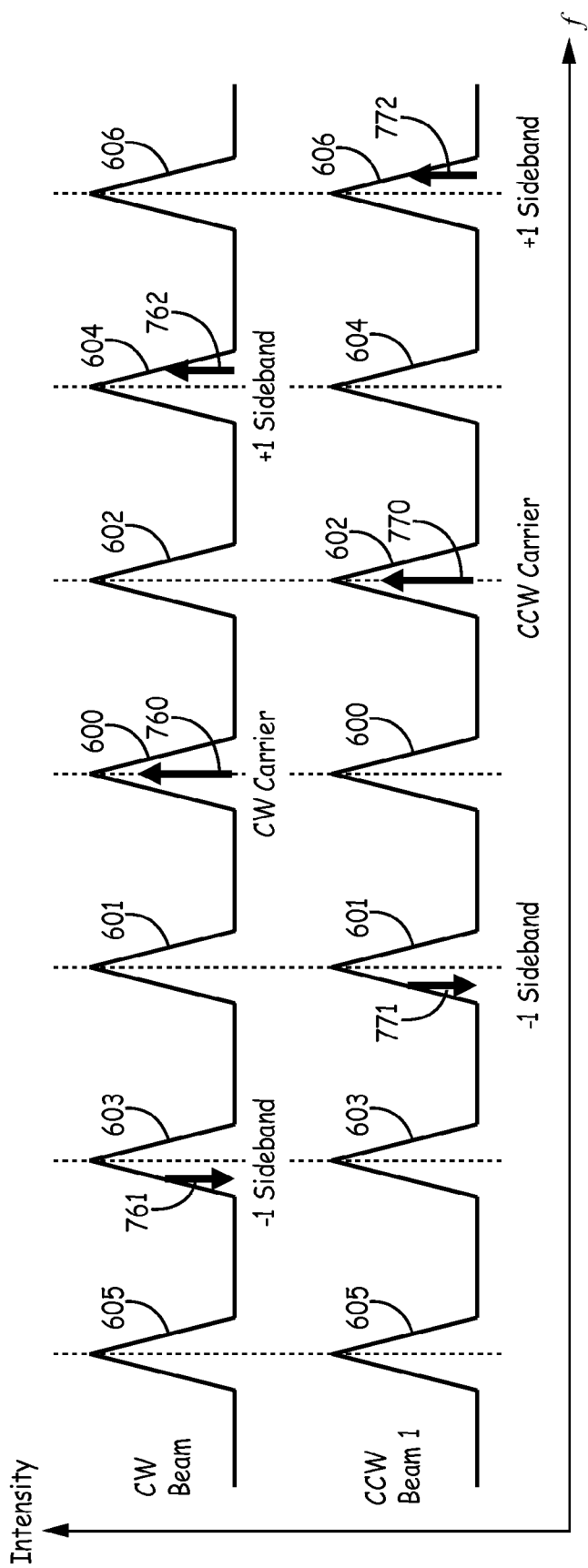
FIG. 9 shows exemplary vector arrows representing the frequency, amplitude, and phase of carrier and sideband frequencies for clockwise and counter-clockwise beams relative to resonance peaks of the gyro resonator to prevent interference from backscatter in accordance with the present invention.

FIG. 9 shows exemplary vector arrows representing the frequency, amplitude and phase of carrier and sideband frequencies for CW and CCW beams relative to resonance peaks of the gyro resonator 150 to prevent interference from backscatter in accordance with the present invention. As shown, the resonance mode of the carrier frequency 760 for the CW beam 126 (FIG. 1) is offset from the resonance mode of the carrier frequency 770 for the CCW beam 125 (FIG. 1). Specifically, the carrier frequency 760 of the CW beam at the resonance peak 600 is offset from the carrier frequency 770 of the CCW beam at the resonance peak 602 by one FSR. In this exemplary case, the modulation frequency of the CW beam and the CCW beam are both set to $2f_{FSR}$. Thus, the CW beam lower sideband frequency 761 at the resonance peak 603 and the CW beam upper sideband frequency 762 at the resonance peak 604 are not at the carrier frequency 770 at the resonance peak 602 of the CCW beam. Likewise, the CW beam lower sideband frequency 761 at the resonance peak 603 and the CW beam upper sideband frequency 762 at the resonance peak 604 are not at the CCW beam lower sideband frequency 771 at the resonance peak 601 and are not at the CCW beam upper sideband frequency 772 at the resonance peak 606.

This selection of resonance mode and frequency modulation prevents overlap in frequency of the carriers and the sidebands. Thus, the interference between any back reflection on the CW beam and the CCW beam or between any back reflection on the CCW and the CW beam occurs at frequencies far enough away from the demodulation frequencies and thus can be easily filtered out. Other modulation frequencies can be selected to avoid overlap of the carrier and sideband frequencies of the CW and CCW beams.

The embodiments of systems described herein allow for filtering by the sensing coil of the resonator itself. In one implementation of this embodiment, the modulation frequency is 10 times the gyro resonator FSR. Then, any RIN noise and laser phase noise at frequencies less than 10 $f_{FSR}$ are attenuated by the filtering effect of the sensing coil.

For commercial products this could be 10 $f_{FSR}$=50 MHz. A lithium niobate (LiNbO$_3$) phase modulator is capable of operating at such high frequencies; however these types of phase modulators are expensive for commercial applications. Unless low cost, high bandwidth phase modulators are developed, the preferred embodiment for commercial applications is with no phase modulator. The phase modulators can be eliminated by applying the PDH modulation to the lasers. In another implementation of this embodiment, the laser frequency sidebands are generated by modulating the laser frequency directly, e.g., by modulating the injection current of a semiconductor laser or an electro-optic element within the lasing cavity.

Figure 10:
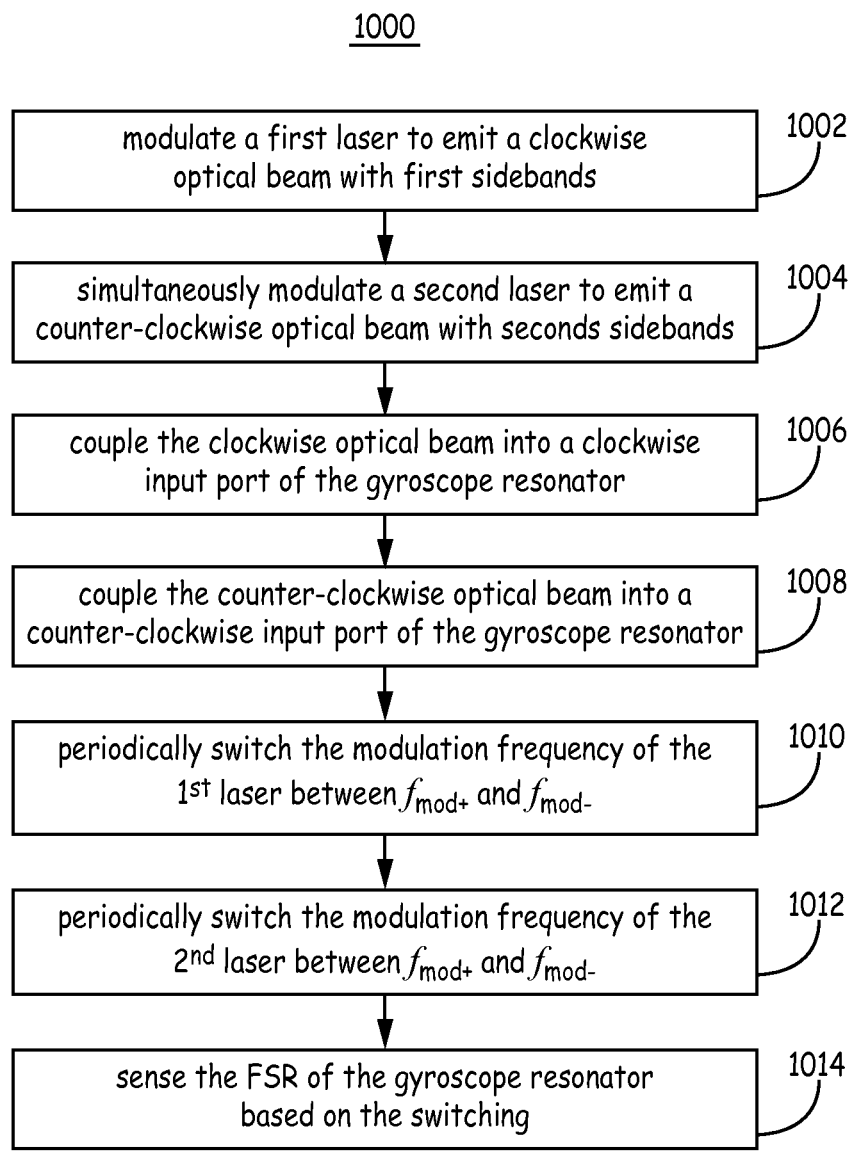
FIG. 10 is a flow diagram of one embodiment of a method to detect resonance frequencies and free spectral range in accordance with the present invention; and In accordance with common practice, the various described features are not drawn to scale but are drawn to emphasize features relevant to the present invention. Like reference characters denote like elements throughout figures and text.

FIG. 10 is a flow diagram of one embodiment of a method 1000 to detect resonance frequencies and free spectral range in accordance with the present invention. The method 1000 is described with reference to the RFOG 10 in FIG. 1 although the method can be implemented on other embodiments of the RFOGs described herein.

At block 1002, a first laser 106 (i.e., CW laser 106) is modulated to emit a clockwise optical beam 126 with first sidebands at up-shifted and down-shifted frequencies. The first laser modulation frequency is one of a first multiple integral of a FSR (e.g., $f_{1\ mod\pm}=Nf_{FSR}$) or a first multiple integral of the FSR plus a first delta (e.g., $f_{1\ mod\pm}=Nf_{FSR}\pm\Delta f_1$).

Block 1004 is optional. If block 1004 is not implemented, the FSR of the resonator gyro is detected by the modulation of the CW optical beam 126 as is understandable to one skilled in the art upon reading and understanding this document.

At block 1004, a second laser 105 (i.e., CCW laser 105) is simultaneously modulated to emit a counter-clockwise optical beam 125 with second sidebands at up-shifted and down-shifted frequencies. The second laser modulation frequency is one of a second multiple integral of the FSR (e.g., $f_{2\ mod\pm}=Mf_{FSR}$) or a second multiple integral of the FSR plus a second delta (e.g., $f_{2\ mod\pm}=Mf_{FSR}\pm\Delta f_2$) that is different than the first delta for the first laser 106 (e.g., M does not equal N). In this case, the CCW PDH modulation generator 101 and the CW PDH modulation generator 102 each generate a different $\Delta f$. In another implementation of this embodiment, the CCW PDH modulation generator 101 and the CW PDH modulation generator 102 each generate the same $\Delta f$.

In this manner, the RFOG 10 locks the clockwise (CW) and counter-clockwise (CCW) laser frequencies onto different longitudinal modes of the gyro sensing resonator 150 (see FIG. 1). The carrier frequency of the first laser 106 is locked on a first CW longitudinal mode of the sensing resonator 150. The carrier frequency of the second laser 105 is locked on a second CCW longitudinal mode of the sensing resonator 150. The second CCW longitudinal mode is offset from the first CW longitudinal mode by at least one (i.e., M−N≥1) free spectral range (i.e., M−N) of the gyroscope resonator 150.

A Pound-Drever-Hall modulation sine wave is output at a frequency modulation $f_{1\ mod\pm}$ from a first port of the CW (first) Pound-Drever-Hall modulation generator 102 to the CW (first) phase modulator 112 in the path of the clockwise optical beam 126.

If block 1004 is implemented, a Pound-Drever-Hall modulation sine wave at the frequency modulation $f_{2\ mod\pm}$ is output from a first port of the CCW (second) Pound-Drever-Hall modulation generator 101 to the CCW (second) phase modulator 111 in the path of the counter-clockwise optical beam 125.

At block 1006, the clockwise optical beam 126 is coupled into a clockwise input port 152 of the gyroscope resonator 150. At block 1008, the counter-clockwise optical beam 125 is coupled into a counter-clockwise input port 151 of the gyroscope resonator 150.

At block 1010, the RFOG 10 periodically switches the modulation frequency of the first laser (CW laser) 106 between $f_{mod+}$ and $f_{mod-}$. At block 1012, the RFOG 10 periodically switches the modulation frequency of the second laser (CCW laser) 105 between $f_{mod+}$ and $f_{mod-}$. The switching combined with double demodulation modulates a bias error of the gyroscope resonator 150 while rotation information remains the same and errors due to imperfection in the modulation are canceled.

The state of the switch 450 in the in the FSR-detection-and-servo electronics 202 and 252 is switched from outputting the summed signal C to outputting the differenced signal D (see FIG. 2) to switch from $f_{mod+}$ and $f_{mod-}$. Likewise, the state of the switch 450 in the in the FSR-detection-and-servo electronics 202 and 252 is switched from outputting the differenced signal D to outputting the summed signal C (see FIG. 2) to switch from $f_{mod-}$ and $f_{mod+}$.

At block 1014, the FSR of the gyroscope resonator 150 is sensed based on the switching since the laser frequency modulation or phase modulation is modulated at a lower frequency than the resonance tracking modulation of the CW and CCW lasers. The rate of rotation of the gyroscope resonator is determined using synchronous detection techniques. As described herein, the bias errors due to modulation imperfections (intensity modulation and second harmonic distortion) are not modulated by the modulation at the PDH modulation frequency and are thus rejected. For both PDH modulation frequencies $f_{FSR}+\Delta f$ and $f_{FSR}-\Delta f$ of the CW and CCW optical beams there is a bias error resulting from second harmonic distortion. However, as long as the resonance peaks are symmetric and the average PDH modulation frequency is at a resonator FSR, the bias errors have the same amplitude and therefore are not modulated by switching the PDH modulation frequency. In this manner, RFOG 10 discriminates between the wanted resonance detection signal and the unwanted bias errors.

Example Embodiments

Example 1 includes a resonator fiber optic gyroscope, comprising: a gyroscope resonator having a clockwise input port and a counter-clockwise input port and a free spectral range (FSR); a first laser configured to couple a clockwise optical beam into to the clockwise input port; a clockwise Pound-Drever-Hall modulation generator to modulate the clockwise optical beam with a resonance tracking modulation before the clockwise optical beam is coupled into the clockwise input port; bias correction electronics; free spectral range (FSR)-detection-and-servo electronics including a switch communicatively coupled to the clockwise Pound-Drever-Hall modulation generator; a clockwise transmission detector configured to receive an optical beam output from the counter-clockwise input port and output signals to the bias correction electronics and the FSR-detection-and-servo electronics; and a second laser configured to couple a counter-clockwise optical beam into to the counter-clockwise input port, wherein the FSR of the gyroscope resonator is measured based on the Pound-Drever-Hall modulation of the clockwise optical beam.

Example 2 includes the resonator fiber optic gyroscope of Example 1, wherein the bias correction electronics are first bias correction electronics, the FSR-detection-and-servo electronics are first FSR-detection-and-servo electronics, the resonance tracking modulation is a first resonance tracking modulation, and the switch is a first switch, the resonator fiber optic gyroscope further comprising: a counter-clockwise Pound-Drever-Hall modulation generator to modulate the counter-clockwise optical beam with a second resonance tracking modulation before the counter-clockwise optical beam is coupled into the counter-clockwise input port; second bias correction electronics; second FSR-detection-and-servo electronics including a second switch communicatively coupled to the counter-clockwise Pound-Drever-Hall modulation generator; and a counter-clockwise transmission detector arranged to receive an optical beam output from the clockwise input port and to output signals to the second bias correction electronics and the second FSR-detection-and-servo electronics, wherein the FSR is measured based on the Pound-Drever-Hall modulation of the clockwise optical beam and the Pound-Drever-Hall modulation of the counter-clockwise optical beam.

Example 3 includes the resonator fiber optic gyroscope of Example 2, wherein the first bias correction electronics and the second bias correction electronics include: an analog-to-digital convertor; a first digital mixer to receive input from the analog-to-digital convertor; a second digital mixer to receive input from the first digital mixer; an accumulator to receive input from the second digital mixer and to control a Pound-Drever-Hall loop locking set point, wherein a bias error is controlled to a zero mean; and a digital-to-analog convertor, wherein output from the digital-to-analog convertor in the first bias correction electronics is input to clockwise Pound-Drever-Hall servo electronics, and wherein output from the digital-to-analog convertor in the second bias correction electronics is input to counter-clockwise Pound-Drever-Hall servo electronics.

Example 4 includes the resonator fiber optic gyroscope of Example 3, wherein the first FSR-detection-and-servo electronics and second FSR-detection-and-servo electronics further include a respective clock to generate clock signals to control the respective first switch and second switch, and wherein the clock signals from the first and second FSR-detection-and-servo electronics are input to the second digital mixer in the respective first and second bias correction electronics, wherein the modulation frequency of the first laser is periodically switched between $f_{mod+}$ and $f_{mod-}$, wherein the modulation frequency of the second laser is periodically switched between $f_{mod+}$ and $f_{mod-}$, wherein the periodic switching cancels errors due to imperfections in the modulation, and wherein the FSR of the gyroscope resonator is sensed based on the periodic switching.

Example 5 includes the resonator fiber optic gyroscope of any of Examples 3-4, wherein a voltage signal output from the clockwise transmission detector is input to the analog-to-digital convertor in the first bias correction electronics and is input to an analog-to-digital convertor in the first free spectral range (FSR)-detection-and-servo electronics, wherein, within the first bias correction electronics, output from the analog-to-digital convertor is mixed with a reference signal at the modulation frequency $f_{mod}$ at the first digital mixer, and output from the first digital mixer is mixed with the clock signal, occurring at a switching frequency, from a clock in the first FSR-detection-and-servo electronics; wherein a voltage signal output from the counter-clockwise transmission detector is input to the analog-to-digital convertor in the second bias correction electronics and is input to an analog-to-digital convertor in the second free spectral range (FSR)-detection-and-servo electronics; and wherein, within the second bias correction electronics, output from the analog-to-digital convertor in mixed with the reference signal at the modulation frequency $f_{mod}$ at the first digital mixer, and output from the first digital mixer is mixed with the clock signal, occurring at a switching frequency, from a clock in the second FSR-detection-and-servo electronics.

Example 6 includes the resonator fiber optic gyroscope of any of Examples 2-5, wherein the clockwise Pound-Drever-Hall modulation generator includes: a first direct digital synthesizer to receive first digital data representing the modulation frequency from the respective first and second FSR-detection-and-servo electronics and to output an analog sine wave voltage at the Pound-Drever-Hall modulation frequency; a second direct digital synthesizer to receive second digital data output representing twice the modulation frequency from the respective first and second FSR-detection-and-servo electronics and to output a digital reference signal at twice the Pound-Drever-Hall modulation frequency; and a direct-digital-synthesizer clock common to the first and second direct digital synthesizers.

Example 7 includes the resonator fiber optic gyroscope of any of Examples 2-6, wherein the clockwise optical beam has a first frequency set to one of a first clockwise longitudinal resonance modes of the sensing resonator, and wherein the counter-clockwise optical beam has a second frequency set to one of a second counter-clockwise longitudinal resonance modes of the sensing resonator that is different than the first longitudinal mode for the clockwise optical beam, the first longitudinal mode and second longitudinal mode differing by at least one FSR.

Example 8 includes the resonator fiber optic gyroscope of any of Examples 2-7, wherein the clockwise optical beam has a phase modulation frequency set to a first multiple integral of the FSR or a first multiple integral of the FSR plus a first delta and wherein the counter-clockwise optical beam has a frequency set to a second multiple integral of the FSR or a second multiple integral of the FSR plus a second delta that is different than the first delta for the clockwise optical beam, the first multiple and second multiple differing by at least one.

Example 9 includes the resonator fiber optic gyroscope of Example 1, wherein the bias correction electronics include: an analog-to-digital convertor; a first digital mixer to receive input from the analog-to-digital convertor; a second digital mixer to receive input from the first digital mixer; an accumulator to receive input from the second digital mixer and to control a Pound-Drever-Hall loop locking set point, wherein a bias error is controlled to a zero mean; and a digital-to-analog convertor, wherein output from the digital-to-analog convertor in the bias correction electronics is input to clockwise Pound-Drever-Hall servo electronics; wherein the FSR-detection-and-servo electronics include: a clock to generate clock signals to control the switch, and wherein the clock signals are input to the second digital mixer in the bias correction electronics, wherein the modulation frequency of the laser is periodically switched between $f_{mod+}$ and $f_{mod-}$ to cancel errors due to imperfections in the modulation and to sense the FSR of the gyroscope resonator; wherein a voltage signal output from the clockwise transmission detector is input to the analog-to-digital convertor in the bias correction electronics and is input to an analog-to-digital convertor in the free spectral range (FSR)-detection-and-servo electronics, wherein output from the analog-to-digital convertor in the bias correction electronics is mixed with a reference signal at the modulation frequency $f_{mod}$ at the first digital mixer, and output from the first digital mixer is mixed with the clock signal, occurring at a switching frequency, from the clock in the FSR-detection-and-servo electronics; and wherein the clockwise Pound-Drever-Hall modulation generator includes; a first direct digital synthesizer to receive first digital data representing the modulation frequency from the FSR-detection-and-servo electronics and to output an analog sine wave voltage at the Pound-Drever-Hall modulation frequency; a second direct digital synthesizer to receive second digital data output representing twice the modulation frequency from the FSR-detection-and-servo electronics and to output a digital reference signal at twice the Pound-Drever-Hall modulation frequency; and a direct-digital-synthesizer clock common to the first and second direct digital synthesizers.

Example 10 includes a method of measuring a free spectral range (FSR) of a gyroscope resonator in a resonator fiber optic gyroscope, the method comprising: modulating a laser to emit a clockwise optical beam with sidebands at up-shifted and down-shifted frequencies, wherein a laser modulation frequency is one of a first multiple integral of a FSR or the first multiple integral of the FSR plus a delta; and coupling the clockwise optical beam into a clockwise input port of the gyroscope resonator; coupling a counter-clockwise optical beam into a counter-clockwise input port of the gyroscope resonator; periodically switching the modulation frequency of the laser between $f_{mod+}$ and $f_{mod-}$ to cancel out errors due to imperfection in the modulation; and sensing the FSR of the gyroscope resonator based on the switching.

Example 11 includes the method of Example 10, wherein the laser is a first laser, the sidebands are first sidebands, the laser modulation frequency is a first laser modulation frequency, and the delta is a first delta, the method further comprising: simultaneously modulating a second laser to emit the counter-clockwise optical beam with second sidebands at up-shifted and down-shifted frequencies, wherein the second laser modulation frequency is one of a second multiple integral of the FSR or the second multiple integral of the FSR plus a second delta; and periodically switching the modulation frequency of the second laser between $f_{mod+}$ and $f_{mod-}$, to cancel out errors due to imperfection in the modulation.

Example 12 includes the method of any of Examples 10-11, further comprising: locking the carrier frequency of the first laser on a first longitudinal mode of the gyroscope resonator; and locking the carrier frequency of the second laser on a second longitudinal mode of the gyroscope resonator, the second longitudinal mode being offset from the first longitudinal mode by at least one free spectral range of the gyroscope resonator.

Example 13 includes the method of any of Examples 10-12, further comprising: outputting a Pound-Drever-Hall modulation sine wave at the first frequency modulation from a first port of a first Pound-Drever-Hall modulation generator to a first phase modulator in the path of the clockwise optical beam.

Example 14 includes the method of any of Examples 11-13, further comprising: outputting a Pound-Drever-Hall modulation sine wave at the second frequency modulation from a first port of a second Pound-Drever-Hall modulation generator to a second phase modulator in the path of the counter-clockwise optical beam.

Example 15 includes the method of any of Examples 10-14, further comprising: using synchronous detection techniques to determine a rate of rotation of the gyroscope resonator.

Example 16 includes a resonator fiber optic gyroscope, comprising: a gyroscope resonator having a clockwise input port and a counter-clockwise input port and a free spectral range (FSR); a first laser configured to couple a clockwise optical beam into to the clockwise input port; a clockwise Pound-Drever-Hall modulation generator; a clockwise phase modulator communicatively coupled to the clockwise Pound-Drever-Hall modulation generator, the clockwise phase modulator operable to modulate the clockwise optical beam; a clockwise transmission photodetector positioned to detect the optical beam output from the counter-clockwise input port of the gyroscope resonator; first bias correction electronics to input signals from the clockwise transmission photodetector; first free spectral range (FSR)-detection-and-servo electronics to input signals from the clockwise transmission photodetector, wherein the first FSR-detection-and-servo electronics include a first switch; clockwise Pound-Drever-Hall servo electronics to input signals from the first bias correction electronics and to output signals to the clockwise phase modulator and to the first laser; a second laser configured to couple a counter-clockwise optical beam into to the clockwise input port; a counter-clockwise Pound-Drever-Hall modulation generator; a counter-clockwise phase modulator communicatively coupled to the counter-clockwise Pound-Drever-Hall modulation generator, the counter-clockwise phase modulator operable to modulate the counter-clockwise optical beam; a counter-clockwise transmission photodetector positioned to detect the optical beam output from the counter-clockwise input port of the gyroscope resonator; second bias correction electronics to input signals from the counter-clockwise transmission photodetector; second FSR-detection-and-servo electronics to input signals from the counter-clockwise transmission photodetector, the second FSR-detection-and-servo electronics including a second switch, wherein the first switch and second switch are operable to periodically switch a modulation frequency of the respective first and second laser between a first modulation frequency and a second modulation frequency.

Example 17 includes the resonator fiber optic gyroscope of Example 16, wherein the first bias correction electronics include a first digital mixer, which demodulates at the first modulation frequency to measure a frequency difference between the clockwise optical beam and the resonator resonance frequency in the clockwise direction, and wherein the second bias correction electronics include a first digital mixer, which demodulates at the second modulation frequency to measure a frequency difference between the counter-clockwise optical beam and the resonator resonance frequency in the counter-clockwise direction, wherein upon demodulation the rotation information remains the same and the bias error is modulated.

Example 18 includes the resonator fiber optic gyroscope of any of Examples 16-17, wherein the first FSR-detection-and-servo electronics further include: a first clock to generate first clock signals to control the first switch; a first digital mixer to input a signal at twice the first modulation frequency; and a second digital mixer to input the first clock signals, and wherein second FSR-detection-and-servo electronics further include: a second clock to generate second clock signals to control the second switch; a first digital mixer to input a signal at twice the second modulation frequency; and a second digital mixer to input the second clock signals.

Example 19 includes the resonator fiber optic gyroscope of any of Examples 16-18, wherein the clockwise optical beam has a first frequency set to one of a first clockwise longitudinal resonance modes of the sensing resonator, and wherein the counter-clockwise optical beam has a second frequency set to one of a second counter-clockwise longitudinal resonance modes of the sensing resonator that is different than the first longitudinal mode for the clockwise optical beam, the first longitudinal mode and second longitudinal mode differing by at least one FSR.

Example 20 includes the resonator fiber optic gyroscope of any of Examples 16-19, wherein the clockwise optical beam has a phase modulation frequency set to a first multiple of the FSR and wherein the counter-clockwise optical beam has a phase modulation frequency set to a second multiple of the FSR, the first multiple and second multiple differing by at least one.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A resonator fiber optic gyroscope, comprising:
a gyroscope resonator having a clockwise input port and a counter-clockwise input port and a free spectral range (FSR);
a first laser configured to couple a clockwise optical beam into to the clockwise input port;
a clockwise Pound-Drever-Hall modulation generator to modulate the clockwise optical beam with a resonance tracking modulation before the clockwise optical beam is coupled into the clockwise input port;
bias correction electronics;
free spectral range (FSR)-detection-and-servo electronics including a switch communicatively coupled to the clockwise Pound-Drever-Hall modulation generator;
a clockwise transmission detector configured to receive an optical beam output from the counter-clockwise input port and output signals to the bias correction electronics and the FSR-detection-and-servo electronics; and
a second laser configured to couple a counter-clockwise optical beam into to the counter-clockwise input port, wherein the FSR of the gyroscope resonator is measured based on the Pound-Drever-Hall modulation of the clockwise optical beam.

2. The resonator fiber optic gyroscope of claim 1, wherein the bias correction electronics are first bias correction electronics, the FSR-detection-and-servo electronics are first FSR-detection-and-servo electronics, the resonance tracking modulation is a first resonance tracking modulation, and the switch is a first switch, the resonator fiber optic gyroscope further comprising:
a counter-clockwise Pound-Drever-Hall modulation generator to modulate the counter-clockwise optical beam with a second resonance tracking modulation before the counter-clockwise optical beam is coupled into the counter-clockwise input port;
second bias correction electronics;
second FSR-detection-and-servo electronics including a second switch communicatively coupled to the counter-clockwise Pound-Drever-Hall modulation generator; and
a counter-clockwise transmission detector arranged to receive an optical beam output from the clockwise input port and to output signals to the second bias correction electronics and the second FSR-detection-and-servo electronics, wherein the FSR is measured based on the Pound-Drever-Hall modulation of the clockwise optical beam and the Pound-Drever-Hall modulation of the counter-clockwise optical beam.

3. The resonator fiber optic gyroscope of claim 2, wherein the first bias correction electronics and the second bias correction electronics include:
an analog-to-digital convertor;
a first digital mixer to receive input from the analog-to-digital convertor;
a second digital mixer to receive input from the first digital mixer;
an accumulator to receive input from the second digital mixer and to control a Pound-Drever-Hall loop locking set point, wherein a bias error is controlled to a zero mean; and
a digital-to-analog convertor, wherein output from the digital-to-analog convertor in the first bias correction electronics is input to clockwise Pound-Drever-Hall servo electronics, and wherein output from the digital-to-analog convertor in the second bias correction electronics is input to counter-clockwise Pound-Drever-Hall servo electronics.

4. The resonator fiber optic gyroscope of claim 3, wherein the first FSR-detection-and-servo electronics and second FSR-detection-and-servo electronics further include a respective clock to generate clock signals to control the respective first switch and second switch, and wherein the clock signals from the first and second FSR-detection-and-servo electronics are input to the second digital mixer in the respective first and second bias correction electronics, wherein the modulation frequency of the first laser is periodically switched between $f_{mod+}$ and $f_{mod-}$, wherein the modulation frequency of the second laser is periodically switched between $f_{mod+}$ and $_{mod-}$, wherein the periodic switching cancels errors due to imperfections in the modulation, and wherein the FSR of the gyroscope resonator is sensed based on the periodic switching.

5. The resonator fiber optic gyroscope of claim 3, wherein a voltage signal output from the clockwise transmission detector is input to the analog-to-digital convertor in the first bias correction electronics and is input to an analog-to-digital convertor in the first free spectral range (FSR)-detection-and-servo electronics,
wherein, within the first bias correction electronics, output from the analog-to-digital convertor is mixed with a reference signal at the modulation frequency $f_{mod}$ at the first digital mixer, and output from the first digital mixer is mixed with the clock signal, occurring at a switching frequency, from a clock in the first FSR-detection-and-servo electronics;
wherein a voltage signal output from the counter-clockwise transmission detector is input to the analog-to-digital convertor in the second bias correction electronics and is input to an analog-to-digital convertor in the second free spectral range (FSR)-detection-and-servo electronics; and
wherein, within the second bias correction electronics, output from the analog-to-digital convertor in mixed with the reference signal at the modulation frequency $f_{mod}$ at the first digital mixer, and output from the first digital mixer is mixed with the clock signal, occurring at a switching frequency, from a clock in the second FSR-detection-and-servo electronics.

6. The resonator fiber optic gyroscope of claim 2, wherein the clockwise Pound-Drever-Hall modulation generator includes:
a first direct digital synthesizer to receive first digital data representing the modulation frequency from the respective first and second FSR-detection-and-servo electronics and to output an analog sine wave voltage at the Pound-Drever-Hall modulation frequency;
a second direct digital synthesizer to receive second digital data output representing twice the modulation frequency from the respective first and second FSR-detection-and-servo electronics and to output a digital reference signal at twice the Pound-Drever-Hall modulation frequency; and
a direct-digital-synthesizer clock common to the first and second direct digital synthesizers.

7. The resonator fiber optic gyroscope of claim 2, wherein the clockwise optical beam has a first frequency set to one of a first clockwise longitudinal resonance modes of the sensing resonator, and
wherein the counter-clockwise optical beam has a second frequency set to one of a second counter-clockwise longitudinal resonance modes of the sensing resonator that is different than the first longitudinal mode for the clockwise optical beam, the first longitudinal mode and second longitudinal mode differing by at least one FSR.

8. The resonator fiber optic gyroscope of claim 2, wherein the clockwise optical beam has a phase modulation frequency set to a first multiple integral of the FSR or a first multiple integral of the FSR plus a first delta and wherein the counter-clockwise optical beam has a phase modulation frequency set to a second multiple integral of the FSR or a second multiple integral of the FSR plus a second delta that is different than the first delta for the clockwise optical beam, the first multiple and second multiple differing by at least one.

9. The resonator fiber optic gyroscope of claim 1, wherein the bias correction electronics include:
  an analog-to-digital convertor;
  a first digital mixer to receive input from the analog-to-digital convertor;
  a second digital mixer to receive input from the first digital mixer;
  an accumulator to receive input from the second digital mixer and to control a Pound-Drever-Hall loop locking set point, wherein a bias error is controlled to a zero mean; and
  a digital-to-analog convertor, wherein output from the digital-to-analog convertor in the bias correction electronics is input to clockwise Pound-Drever-Hall servo electronics;
wherein the FSR-detection-and-servo electronics include:
  a clock to generate clock signals to control the switch, and wherein the clock signals are input to the second digital mixer in the bias correction electronics, wherein the modulation frequency of the laser is periodically switched between $f_{mod+}$ and $f_{mod-}$ to cancel errors due to imperfections in the modulation and to sense the FSR of the gyroscope resonator;
  wherein a voltage signal output from the clockwise transmission detector is input to the analog-to-digital convertor in the bias correction electronics and is input to an analog-to-digital convertor in the free spectral range (FSR)-detection-and-servo electronics,
  wherein output from the analog-to-digital convertor in the bias correction electronics is mixed with a reference signal at the modulation frequency $f_{mod}$ at the first digital mixer, and output from the first digital mixer is mixed with the clock signal, occurring at a switching frequency, from the clock in the FSR-detection-and-servo electronics; and
  wherein the clockwise Pound-Drever-Hall modulation generator includes:
    a first direct digital synthesizer to receive first digital data representing the modulation frequency from the FSR-detection-and-servo electronics and to output an analog sine wave voltage at the Pound-Drever-Hall modulation frequency;
    a second direct digital synthesizer to receive second digital data output representing twice the modulation frequency from the FSR-detection-and-servo electronics and to output a digital reference signal at twice the Pound-Drever-Hall modulation frequency; and
    a direct-digital-synthesizer clock common to the first and second direct digital synthesizers.

10. A method of measuring a free spectral range (FSR) of a gyroscope resonator in a resonator fiber optic gyroscope, the method comprising:
  modulating a laser to emit a clockwise optical beam with sidebands at up-shifted and down-shifted frequencies, wherein a laser modulation frequency is one of a first multiple integral of a FSR or the first multiple integral of the FSR plus a delta; and
  coupling the clockwise optical beam into a clockwise input port of the gyroscope resonator;
  coupling a counter-clockwise optical beam into a counter-clockwise input port of the gyroscope resonator;
  periodically switching the modulation frequency of the laser between $f_{mod+}$ and $f_{mod-}$ to cancel out errors due to imperfection in the modulation; and
  measuring the FSR of the gyroscope resonator based on the switching.

11. The method of claim 10, wherein the laser is a first laser, the sidebands are first sidebands, the laser modulation frequency is a first laser modulation frequency, and the delta is a first delta, the method further comprising:
  simultaneously modulating a second laser to emit the counter-clockwise optical beam with second sidebands at up-shifted and down-shifted frequencies, wherein the second laser modulation frequency is one of a second multiple integral of the FSR or the second multiple integral of the FSR plus a second delta; and
  periodically switching the modulation frequency of the second laser between $f_{mod+}$ and $f_{mod-}$, to cancel out errors due to imperfection in the modulation.

12. The method of claim 11, further comprising:
  locking the carrier frequency of the first laser on a first longitudinal mode of the gyroscope resonator; and
  locking the carrier frequency of the second laser on a second longitudinal mode of the gyroscope resonator, the second longitudinal mode being offset from the first longitudinal mode by at least one free spectral range of the gyroscope resonator.

13. The method of claim 11, further comprising:
  outputting a Pound-Drever-Hall modulation sine wave at the first frequency modulation from a first port of a first Pound-Drever-Hall modulation generator to a first phase modulator in the path of the clockwise optical beam.

14. The method of claim 13, further comprising:
  outputting a Pound-Drever-Hall modulation sine wave at the second frequency modulation from a first port of a second Pound-Drever-Hall modulation generator to a second phase modulator in the path of the counter-clockwise optical beam.

15. The method of claim 10, further comprising:
  using synchronous detection techniques to determine a rate of rotation of the gyroscope resonator.

16. A resonator fiber optic gyroscope, comprising:
  a gyroscope resonator having a clockwise input port and a counter-clockwise input port and a free spectral range (FSR);
  a first laser configured to couple a clockwise optical beam into to the clockwise input port;
  a clockwise Pound-Drever-Hall modulation generator;
  a clockwise phase modulator communicatively coupled to the clockwise Pound-Drever-Hall modulation generator, the clockwise phase modulator operable to modulate the clockwise optical beam;
  a clockwise transmission photodetector positioned to detect the optical beam output from the counter-clockwise input port of the gyroscope resonator;
  first bias correction electronics to input signals from the clockwise transmission photodetector;
  first free spectral range (FSR)-detection-and-servo electronics to input signals from the clockwise transmission photodetector, wherein the first FSR-detection-and-servo electronics include a first switch;

clockwise Pound-Drever-Hall servo electronics to input signals from the first bias correction electronics and to output signals to the clockwise phase modulator and to the first laser;

a second laser configured to couple a counter-clockwise optical beam into to the clockwise input port;

a counter-clockwise Pound-Drever-Hall modulation generator;

a counter-clockwise phase modulator communicatively coupled to the counter-clockwise Pound-Drever-Hall modulation generator, the counter-clockwise phase modulator operable to modulate the counter-clockwise optical beam;

a counter-clockwise transmission photodetector positioned to detect the optical beam output from the counter-clockwise input port of the gyroscope resonator;

second bias correction electronics to input signals from the counter-clockwise transmission photodetector;

second FSR-detection-and-servo electronics to input signals from the counter-clockwise transmission photodetector, the second FSR-detection-and-servo electronics including a second switch, wherein the first switch and second switch are operable to periodically switch a modulation frequency of the respective first and second laser between a first modulation frequency and a second modulation frequency.

17. The resonator fiber optic gyroscope of claim 16, wherein the first bias correction electronics include a first digital mixer, which demodulates at the first modulation frequency to measure a frequency difference between the clockwise optical beam and the resonator resonance frequency in the clockwise direction, and wherein the second bias correction electronics include a first digital mixer, which demodulates at the second modulation frequency to measure a frequency difference between the counter-clockwise optical beam and the resonator resonance frequency in the counter-clockwise direction, wherein upon demodulation the rotation information remains the same and the bias error is modulated.

18. The resonator fiber optic gyroscope of claim 17, wherein the first FSR-detection-and-servo electronics further include:

a first clock to generate first clock signals to control the first switch;

a first digital mixer to input a signal at twice the first modulation frequency; and a second digital mixer to input the first clock signals, and wherein second FSR-detection-and-servo electronics further include:

a second clock to generate second clock signals to control the second switch;

a first digital mixer to input a signal at twice the second modulation frequency; and a second digital mixer to input the second clock signals.

19. The resonator fiber optic gyroscope of claim 16, wherein the clockwise optical beam has a first frequency set to one of a first clockwise longitudinal resonance modes of the sensing resonator, and wherein the counter-clockwise optical beam has a second frequency set to one of a second counter-clockwise longitudinal resonance modes of the sensing resonator that is different than the first longitudinal mode for the clockwise optical beam, the first longitudinal mode and second longitudinal mode differing by at least one FSR.

20. The resonator fiber optic gyroscope of claim 16, wherein the clockwise optical beam has a phase modulation frequency set to a first multiple of the FSR and wherein the counter-clockwise optical beam has a phase modulation frequency set to a second multiple of the FSR, the first multiple and second multiple differing by at least one.

* * * * *